US012129049B2

United States Patent
Roebuck et al.

(10) Patent No.: US 12,129,049 B2
(45) Date of Patent: Oct. 29, 2024

(54) TRANSMISSION ARRANGEMENT FOR AN ELECTRIC PUSHBACK VEHICLE

(71) Applicant: Textron Inc., Providence, RI (US)

(72) Inventors: Trevor Douglas Roebuck, Evans, GA (US); Brian Wallace Yoder, Woodstock, GA (US); Patrick Dwaine Warden, Grovetown, GA (US); Chase Cherek Schofield, Martinez, GA (US); Robert Charles Bradley, Augusta, GA (US); Anthony Christopher Morris, Marietta, GA (US); Joshua David Barnes, Atlanta, GA (US); William Cole Koster, Atlanta, GA (US); Ian Kendall Balk, Atlanta, GA (US); James Chandler Liggett, Statesboro, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 17/768,308

(22) PCT Filed: Oct. 13, 2020

(86) PCT No.: PCT/US2020/055331
§ 371 (c)(1),
(2) Date: Apr. 12, 2022

(87) PCT Pub. No.: WO2021/076477
PCT Pub. Date: Apr. 22, 2021

(65) Prior Publication Data
US 2024/0101274 A1   Mar. 28, 2024

Related U.S. Application Data

(60) Provisional application No. 62/914,960, filed on Oct. 14, 2019.

(51) Int. Cl.
*B60K 1/04*        (2019.01)
*B60K 17/10*      (2006.01)
(Continued)

(52) U.S. Cl.
CPC ............. *B64F 1/225* (2013.01); *B60K 1/04* (2013.01); *B60K 17/10* (2013.01); *B60L 50/66* (2019.02); *B60K 2001/0411* (2013.01)

(58) Field of Classification Search
CPC .. B60K 1/04; B60K 17/10; B60K 2001/0411; B60K 2001/0438; B60L 50/66; H01M 50/202
See application file for complete search history.

(56) References Cited

U.S. PATENT DOCUMENTS 9,216,882 B2 * 12/2015 Nakazawa ............. B60L 58/26
9,593,773 B1 *  3/2017 LaBenne ................ B60K 17/34
(Continued)

FOREIGN PATENT DOCUMENTS

CN    103813923 A    5/2014
GB     2529643 A    3/2016

OTHER PUBLICATIONS

"International Search Report and Written Opinion" mailed Jan. 22, 2021.

*Primary Examiner* — Jason D Shanske
*Assistant Examiner* — James J Triggs
(74) *Attorney, Agent, or Firm* — Billion & Armitage

(57) ABSTRACT

An electric pushback vehicle includes a frame having a forward portion and a rear portion. The vehicle further includes front drive axle and a rear drive axle configured to communicate power to ground engaging members. A traction battery is housed within the electric pushback vehicle and provides electric power to an electric motor to drive an output shaft. A transmission is connected to receive (Continued)

mechanical power from the electric motor through a torque converter.

14 Claims, 25 Drawing Sheets

(51) Int. Cl.
  *B60L 50/60* (2019.01)
  *B64F 1/225* (2024.01)

(56) References Cited

U.S. PATENT DOCUMENTS

| | | |
|---|---|---|
| 2008/0089766 A1 | 4/2008 | Hammonds |
| 2012/0217830 A1* | 8/2012 | Iwase .................... B60L 50/40 310/78 |
| 2019/0092157 A1 | 3/2019 | Sekiguchi et al. |

\* cited by examiner

TRANSMISSION ARRANGEMENT FOR AN ELECTRIC PUSHBACK VEHICLE

CROSS-REFERENCE TO RELATED APPLICATIONS

This application claims the benefit of and priority to U.S. provisional application 62/914,960, titled "ELECTRIC PUSHBACK TRACTOR", filed Oct. 14, 2019, the contents of which are incorporated by reference herein.

TECHNICAL FIELD

The present disclosure is related to pushback tractors for aircraft and in particular to electric pushback tractors.

BACKGROUND

Pushback tractors are vehicles utilized to tow/push aircraft while on the ground. Typical pushback tractors are powered by combustion engines (i.e., diesel engines) designed to provide high torque necessary to move medium to large aircraft. It is beneficial for pushback tractors to provide the operator with visibility and/or other tools to aid in aligning the pushback tractor with the aircraft to be moved. It would also be beneficial to provide a pushback tractor that provides high torque at low speeds and sufficient weight to prevent ground-engaging members (e.g., tires) from slipping during pushback. In addition, it would be beneficial if the pushback tractor included safety features utilized to reduce accidents.

SUMMARY

According to some aspects, an electric pushback vehicle includes a frame having a forward portion and a rear portion. The vehicle further includes front drive axle and a rear drive axle configured to communicate power to ground engaging members. A traction battery is housed within the electric pushback vehicle and provides electric power to an electric motor to drive an output shaft. A transmission is connected to receive mechanical power from the electric motor through a torque converter.

According to another aspect, an electric drive system includes a traction battery, an electric motor, a transmission and a torque converter. The electric motor includes an output shaft, wherein the electric motor is configured to rotate the output shaft in response to power received from the traction battery. The transmission is configured to communicate mechanical power generated by the electric motor to one or more of the front drive axle and the rear drive axle. The torque converter is connected to communicate mechanical power generated by the electric motor to the transmission.

DETAILED DESCRIPTION

Figure 1:
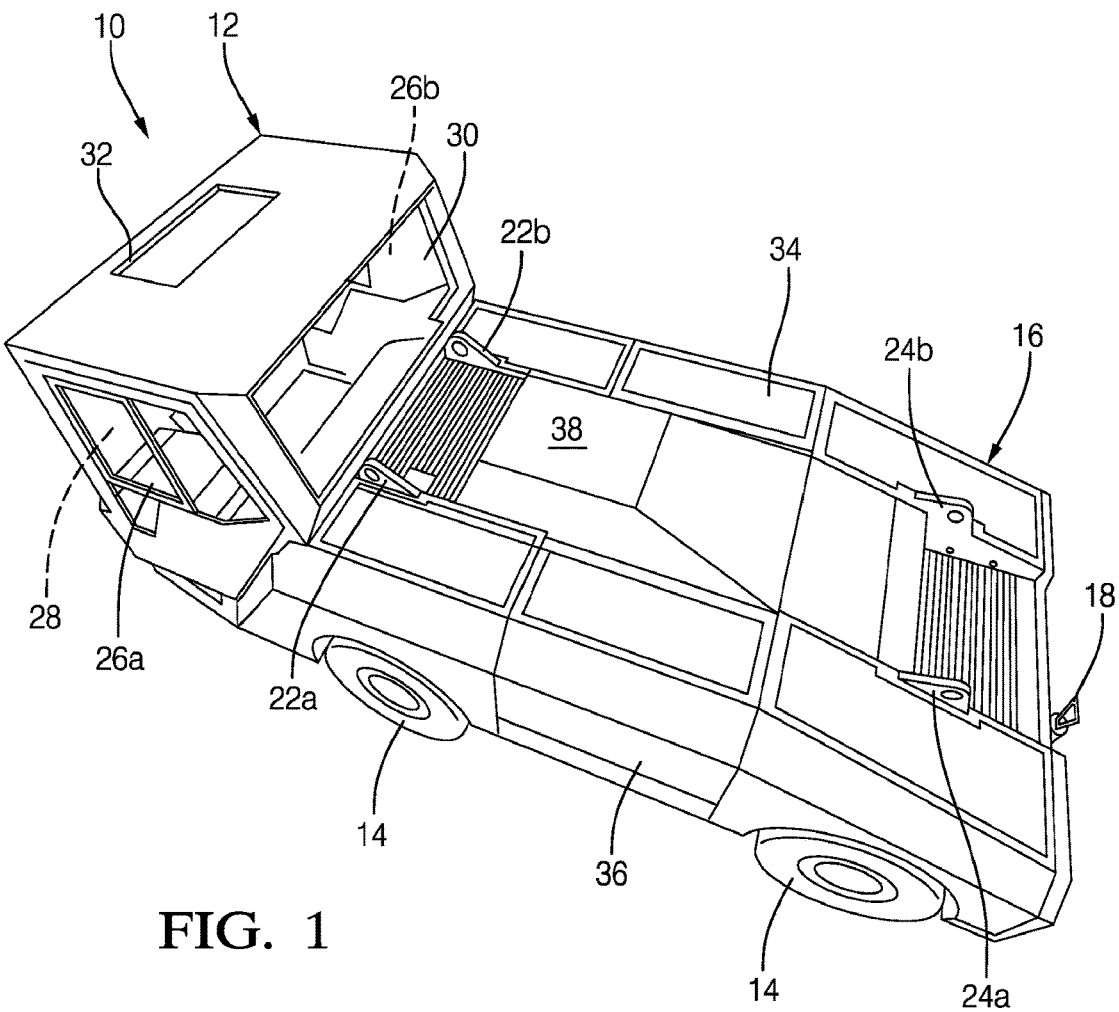
FIG. 1 is rear perspective view of an electric pushback tractor according to some embodiments.
Figure 2:
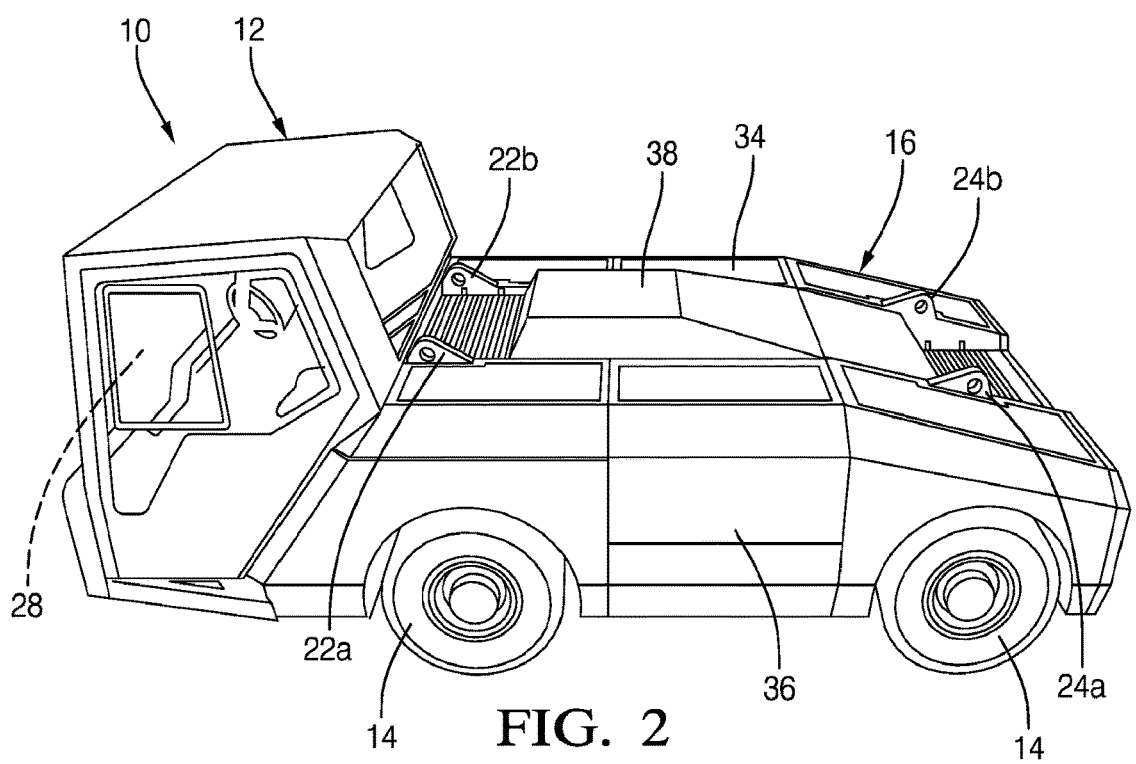
FIG. 2 is an elevated side view of an electric pushback tractor according to some embodiments.
Figure 3:
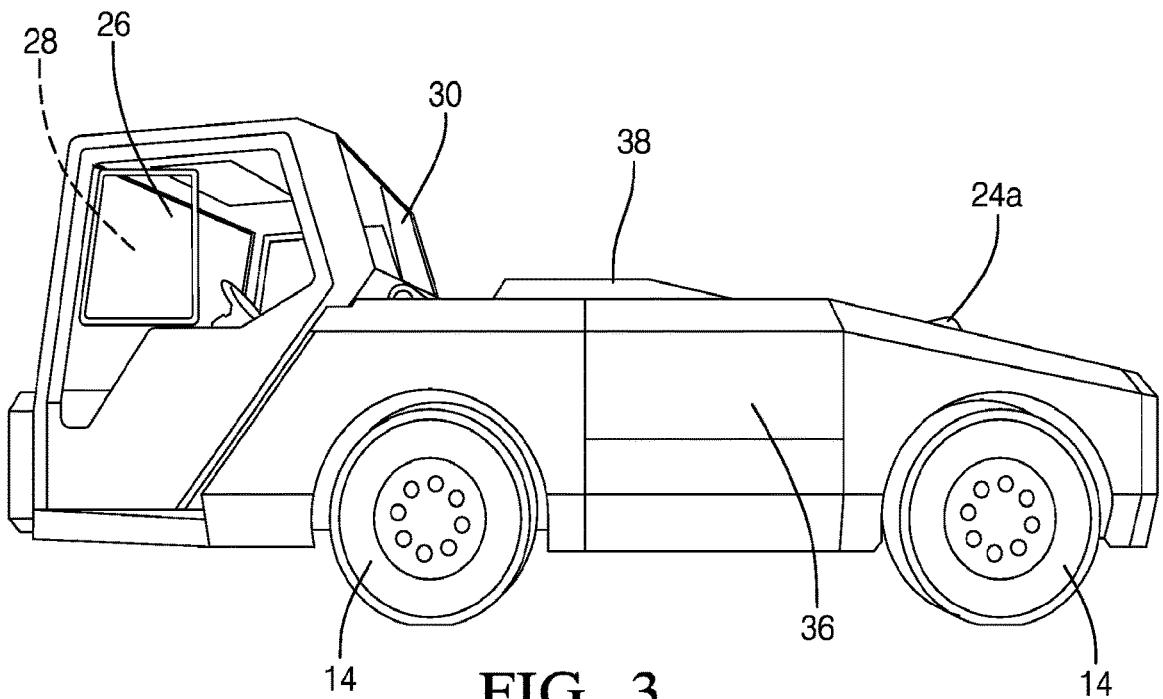
FIG. 3 is a side view of an electric pushback tractor according to some embodiments.

Referring to FIGS. 1-3 an electric pushback tractor 10 is shown. The electric pushback tractor 10 includes an operator cab 12, a plurality of ground-engaging members 14, a main body 16, and a rear hitch 18. The operator cab 12 is located at the front of the electric pushback tractor 10. An operator seated within the operator cab 12 operates the pushback tractor 10. In some embodiments, the operator cab 12 includes a pair of side windows 26a, 26b, windshield 28, and rear window 30. The position of the operator combined with the size and geometry of the windows provides a near 360° view of the vehicle from the operator's seat. In some embodiments, this includes line of sight visibility of the front hitch (not shown). In some embodiments, operator cab 12 includes a skylight window 32. As shown in FIGS. 4-6 and 8-9, in some embodiments the front window (not visible in FIGS. 1-3) includes a central cutout portion that allows the operator to see a front hitch (not shown). In addition, the location of rear window 30 and the low profile of main body 16 allows the operator good visibility of the rear hitch 18. In some embodiments, in addition to the visibility provided by rear window 30 and the low profile of main body 16, a rear facing camera and video display located in the operator cab 12 provides the operator with visibility of the rear hitch 18. In some embodiments, proximity sensors (and/or other sensors0 are utilized to aid the operator in aligning the front and/or rear hitch with an aircraft to be towed/pushed.

In some embodiments, the main body 16 includes a plurality of body panels attached to a frame (shown in FIGS. 4-9). In particular, body panel 34 is hinged body panel that provides access to an electrical maintenance compartment; body panel 36 is a hinged body panel that provides access to hydraulics; and body panel 38 provides access to the main battery. In some embodiments, the frame includes a forward frame lift/hoist joints 22a, 22b and rear frame lift/hoist joints 24a, 24b. These lift/hoist joints 22a, 22b, 24a, and 24b are formed as part of the frame (shown in FIG. 4-6) and be utilized to support the weight of the electric pushback tractor.

Referring to FIGS. 4-8, the frame 50 of the electric pushback tractor 10 and components included within the frame are shown. The frame may be constructed of a plurality of different materials, including steel, carbon steel, aluminium, etc. In some embodiments, because a certain amount of weight is desired in order to ensure electric pushback tractor 10 has sufficient weight to prevent slipping of the ground-engaging members, it is desirable to utilized steel or other relatively heavy material to construct the frame 50. Likewise, the components of the frame 50 may utilize rails and/or beams (e.g., c-beam, rectangular, tube, etc.), or sheets/platforms. In general, the sheets/platforms may increase the weight of the traction vehicle 10, but as discussed above the increased weight may be desirable in some embodiments. The respective components may be welded, bolted, or otherwise affixed to one another as desired.

Figure 4:
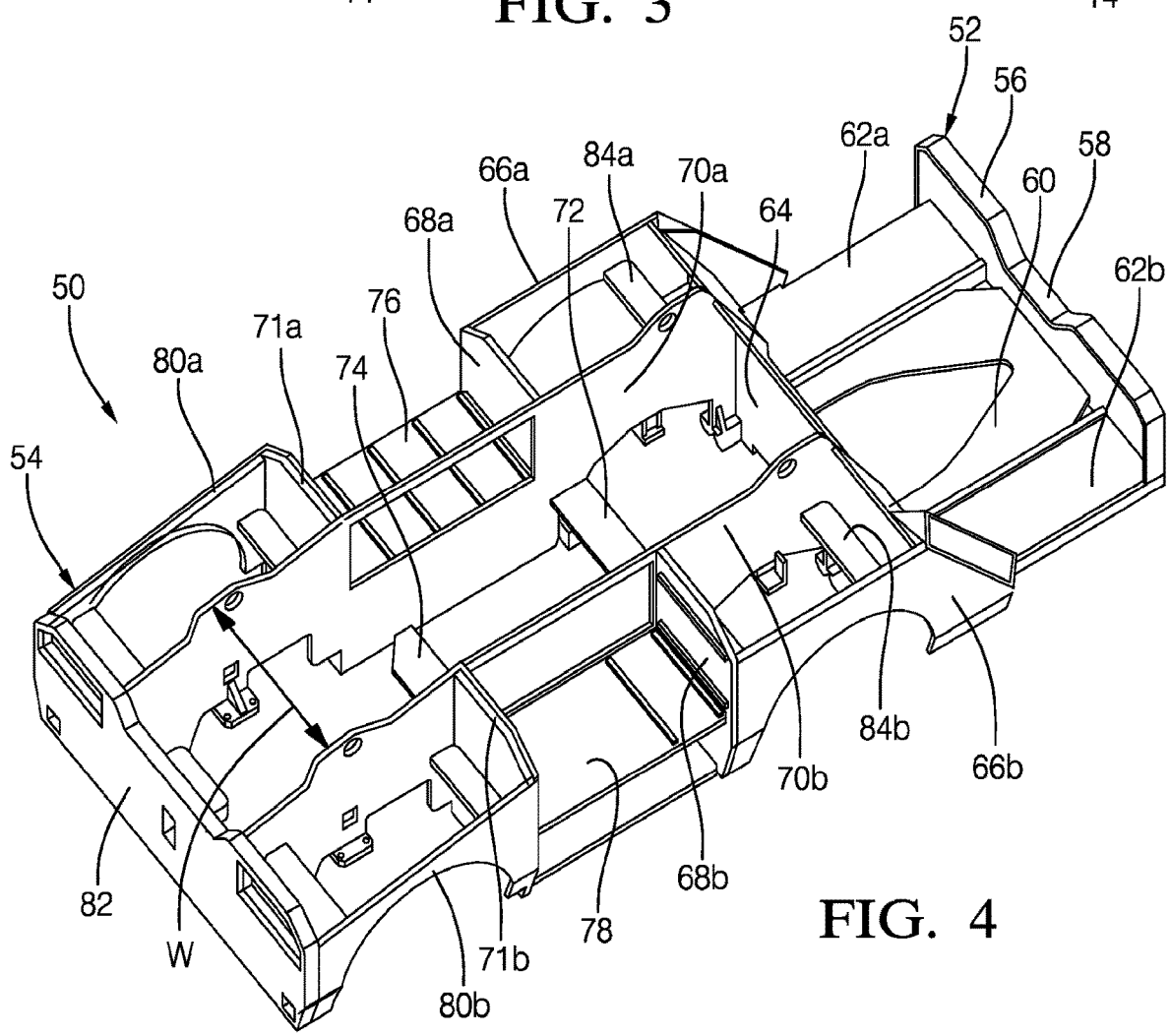
FIG. 4 is a rear perspective view of a frame and internal components of an electric pushback tractor according to some embodiments.

With respect to FIG. 4, frame 50 includes a front frame 52 and a rear frame 54. The front frame 52 includes a front bulkhead 56, center platform member 60, right and left platform member 62a, 62b, and cab bulkhead 64. The rear frame 54 includes is defined by longitudinal members 70a, 70b that extend longitudinally from cab bulkhead 64 to rear bulkhead 82. The longitudinal members 70a, 70b run approximately parallel to one another and are separated by a distance w. In some embodiments one or more cross members 72 and 74 extend laterally between the first and second longitudinal members 70a, 70b. The rear frame 54 includes a forward section that includes side members 66a, 66b and lateral members 84a, 84b. In some embodiments, lateral member 84a extends between side member 66a and longitudinal member 70a; lateral member 84b extends between side member 66b and longitudinal member 70b. The rear frame 54 includes a center portion that includes an electrical maintenance compartment and a hydraulic compartment. The electrical maintenance compartment is defined by frame members including platform 78, longitudinal member 70b, wall member 68b and wall member 71b. The hydraulic compartment is defined by platform 76, longitudinal member 70a, wall member 68a and wall member 71a. As discussed in more detail below, the electrical maintenance compartment is utilized to house and secure electrical components while providing technicians and/or operators with easy access to the various components via the hinged body panel 34 (shown in FIGS. 1-3). Likewise, the hydraulic compartment is utilized to house and secure hydraulic components while providing technicians and/or operators with easy access to the various components via the hinged body panel 36.

With respect to front frame 52, the front bulkhead 56 has a top surface 58 that defines the geometry of the windshield 28. For example, in the embodiment shown in FIG. 4, the top surface 58 has a cut-out portion located in the middle of the front bulkhead 56. This geometry provides the operator with a line-of-sight or near line-of-sight view of the front hitch. In some embodiments, right and left platform members 62a, 62b and center platform 60 extend from front bulkhead 56 to cab bulkhead 64.

Figure 5:
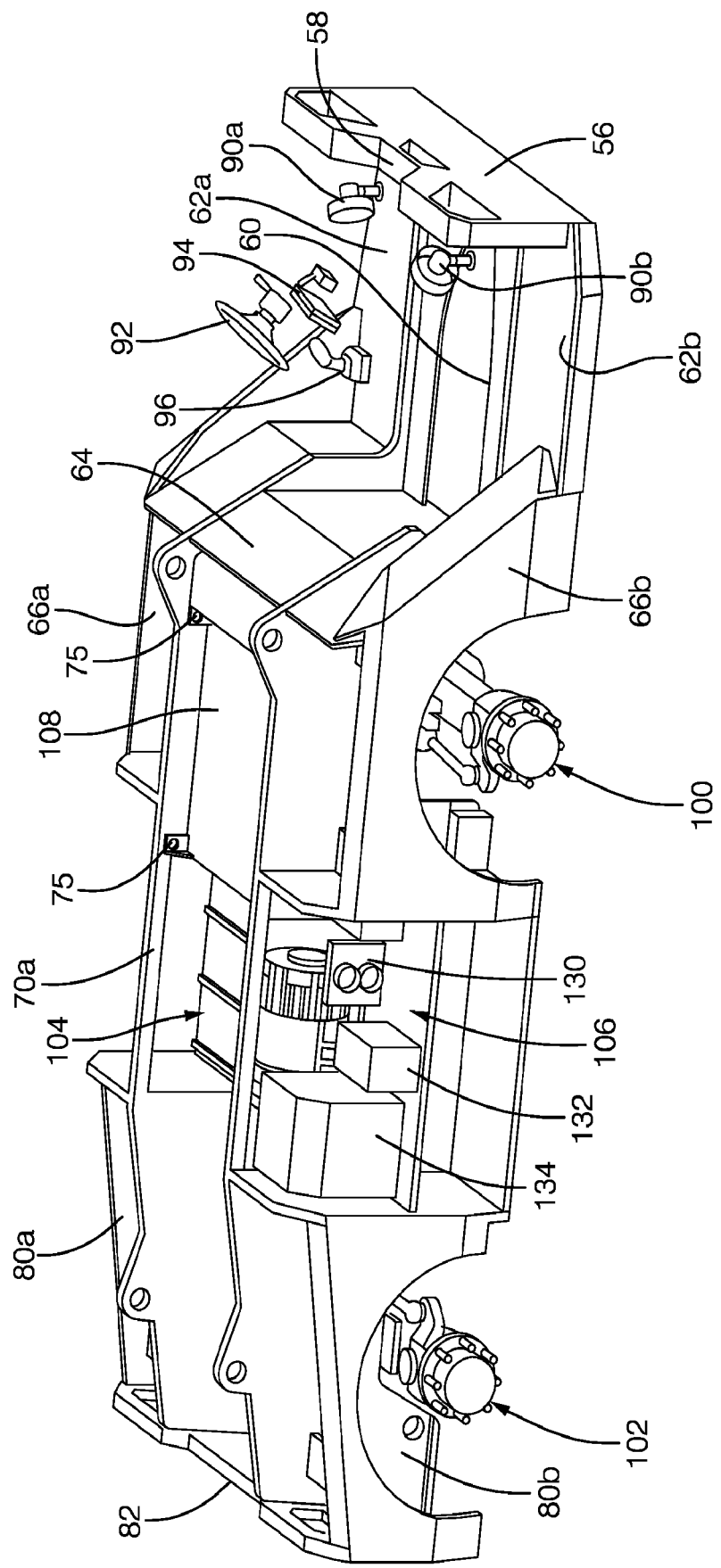
FIG. 5 is a front perspective view of a frame and internal components of an electric pushback tractor according to some embodiments.
Figure 6:
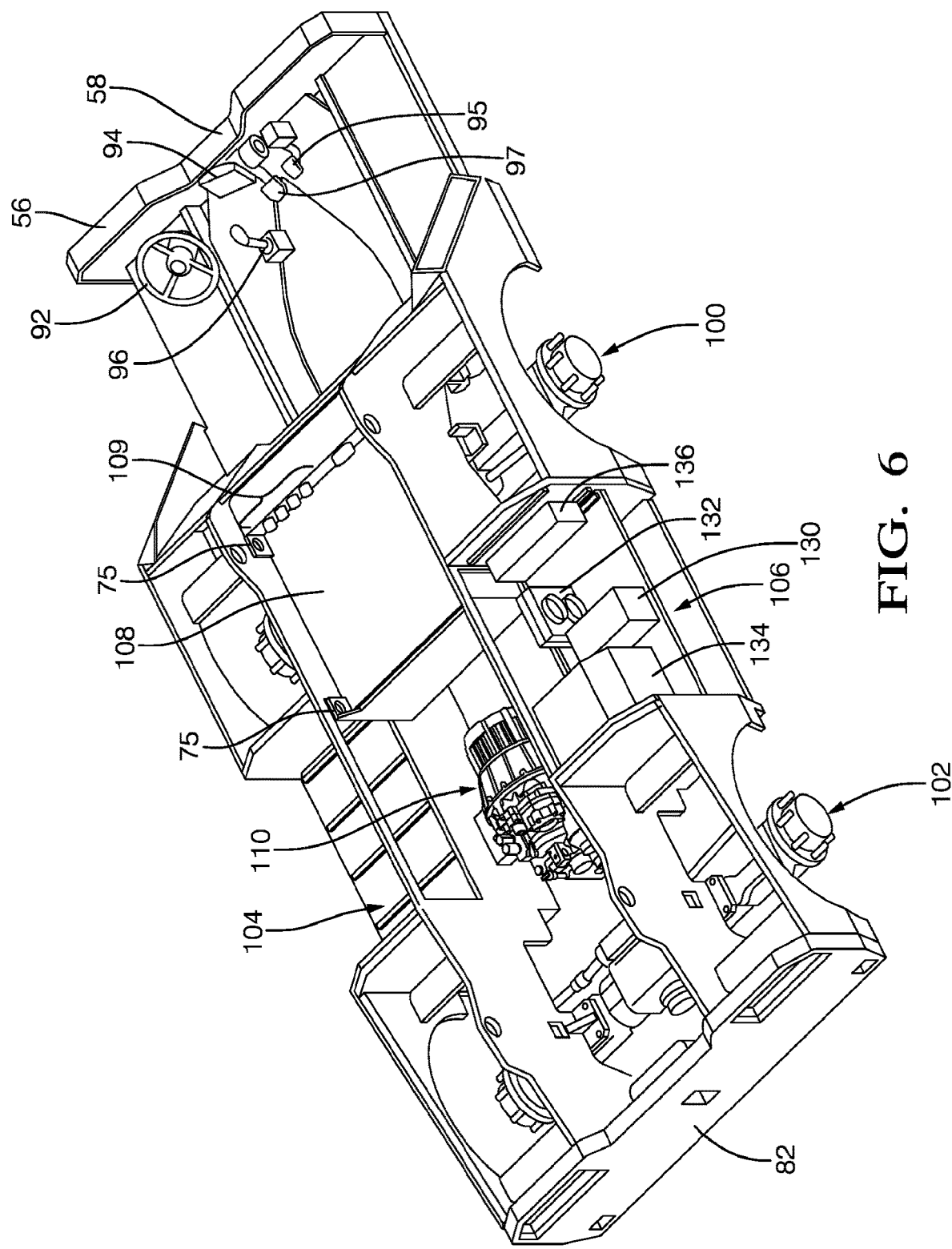
FIG. 6 is a rear perspective view of a frame and internal components of the electric pushback tractor, including electric motor and transmission, according to some embodiments.
Figure 7:
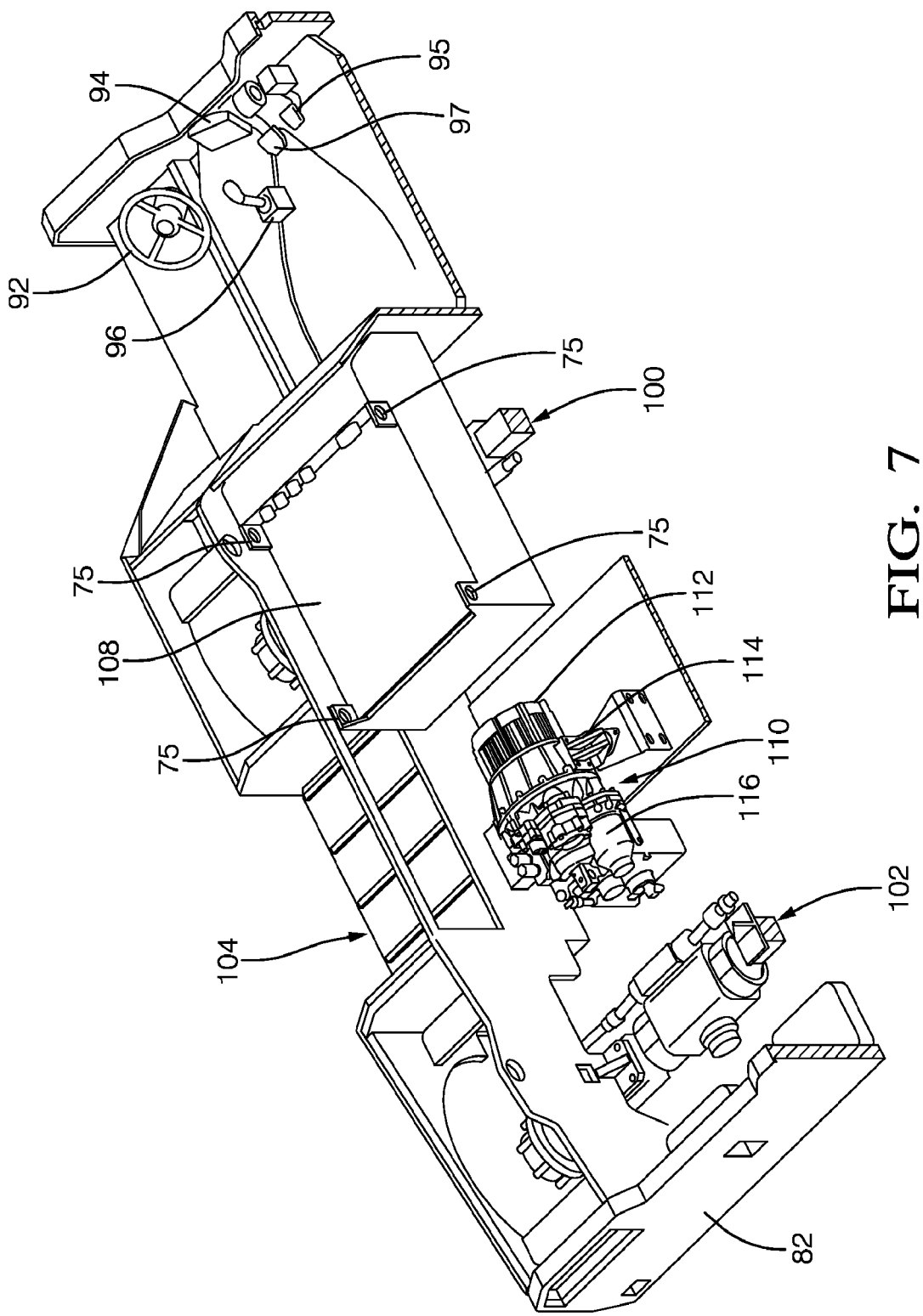
FIG. 7 is a rear perspective view of the frame and internal components of the electric pushback tractor with a passenger side of the frame removed to show the electric motor and transmission according to some embodiments.

As described above, longitudinal members 70a, 70b extend parallel to one another, and are separated by a width w. In some embodiments, the width w between longitudinal members 70a and 70b is approximately equal to the width of the traction battery 108 (shown in FIG. 5) housed between the longitudinal members 70a, 70b. In some embodiments, traction battery 108 is mounted to hard points on the frame 50. As shown in FIGS. 5-7, the traction battery 108 may be secured to the frame via one or more mounting brackets 75. In some embodiments, traction battery 108 is centered along a longitudinal centerline axis of the pushback tractor 10. In some embodiments, the traction battery 108 is located above the front axle 100. In some embodiments, the center of gravity (COG) of the traction battery 108 is over the front axle 100.

As shown in FIGS. 5 and 6, electrical maintenance compartment 106 is located within the region defined by walls 68b and 71b and a platform 78. In some embodiments, electrical maintenance compartment 106 is accessible to operators via hinged body panel 38. In some embodiments, electrical compartment 106 houses motor controller 130, a 12-volt (V) battery 132, electrical cabinet 134, and direct current (DC)-to-DC converter 136. In some embodiments, the geometry of platform 78 and/or of walls 68b and 71b are selected to house and secure the electrical components within the electrical maintenance compartment 106. In addition, the components remain easily accessible to technicians. In some embodiments, traction battery 108 provides DC power to motor controller 130, which selectively provides electrical power to the electric motor 112 (shown in FIG. 7). In some embodiments, motor controller 130 selectively applies to the DC power to the electric motor 112. In some embodiments, motor controller 130 converts the DC power received from the traction battery 108 to an AC output provided to the electric motor 112. In some embodiments, a DC-to-DC converter 136 is utilized to convert DC power received from the traction battery 108 (e.g., 103V DC) to a 12V DC output for provision to on-board electrical components, including 12V battery 132. In addition, in some embodiments a plurality of sense ports 109 associated with traction battery 108 are connected via one or more cables to the electrical maintenance compartment 106 to allow diagnostic to be run on the traction battery from the electrical maintenance compartment. In some embodiments, sense ports 109 provide information regarding charge status of the traction battery 108.

Located on a side opposite the electrical maintenance compartment 106 is a hydraulic compartment 104, which is located within the region defined by the walls 68a, wall 71a, and a platform 76. In some embodiments, platform 76 has a geometry defined to receive and retain particular hydraulic components. In some embodiments, hydraulic components utilize hydraulic power to actuate components on the pushback tractor 10, such as braking systems. In other embodiments, the hydraulic components are utilized as part of a regenerative braking system to accumulate and store energy resulting from braking.

In addition, FIG. 5 illustrates at least some of the plurality of mounting brackets 75 utilized to secure the traction battery 108 to the longitudinal frame members 70a, 70b. In some embodiments, a mounting bracket is located at each corner of the traction battery 108 and is secured to the respective longitudinal frame members 70a, 70b.

As shown in FIG. 7, the electric drive system 110 includes an electric motor 112, an housing adapter 114, and a transmission 116. In some embodiments, the electric drive system is located between longitudinal members 70a, 70b along a longitudinal centerline axis of the vehicle. In some embodiments, DC electric power provided by the traction battery 108 is provided to the electrical maintenance compartment 106, and in particular to the motor controller 130. As described above, DC electric power provided by the traction battery may be selectively applied to the electric motor 112 by motor controller 130. In other embodiments, motor controller 130 converts the DC power received from the traction battery to AC electric power selectively applied to the electric motor 112. In some embodiments, electric motor 112 is a brushed DC motor, a brushless DC motor, or an induction motor. The type of electric motor selected dictates the functions performed by the motor controller 130 to supply power from the traction battery 108 to the electric motor 112.

In response to the electrical input received, the electric motor develops a motive force that is communicated via one or more coupling components (shown in more detail below) to transmission 116. In some embodiments, transmission 116 is an automatic transmission. In other embodiments, other well-known types of transmissions may be utilized. Transmission 116 transmits motive force power received from the electric motor 112 to one or more of the front axle 100 and/or rear axle 102. In some embodiments, transmission 116 may be connected to either an electric motor 112 as shown in FIGS. 5-8, or may be connected to a gas combustion engine (e.g., diesel engine). A benefit is that the transmission and driveline may be utilized with both the electric drive and a combustion drive. In some embodiments, a torque converter is connected to communicate power from the electric motor 112 to the transmission 116. The torque converter provides a torque multiplier under certain operating conditions. For example, the torque converter provides a torque multiplier when transitioning from a stopped or zero inertia moment. In addition, the torque converter can be utilized to drive one or more hydraulic pumps while the vehicle is stationary to prevent dry-starts (i.e., initiating transmission prior to the hydraulic pumps providing transmission fluid to the transmission).

Figure 9:
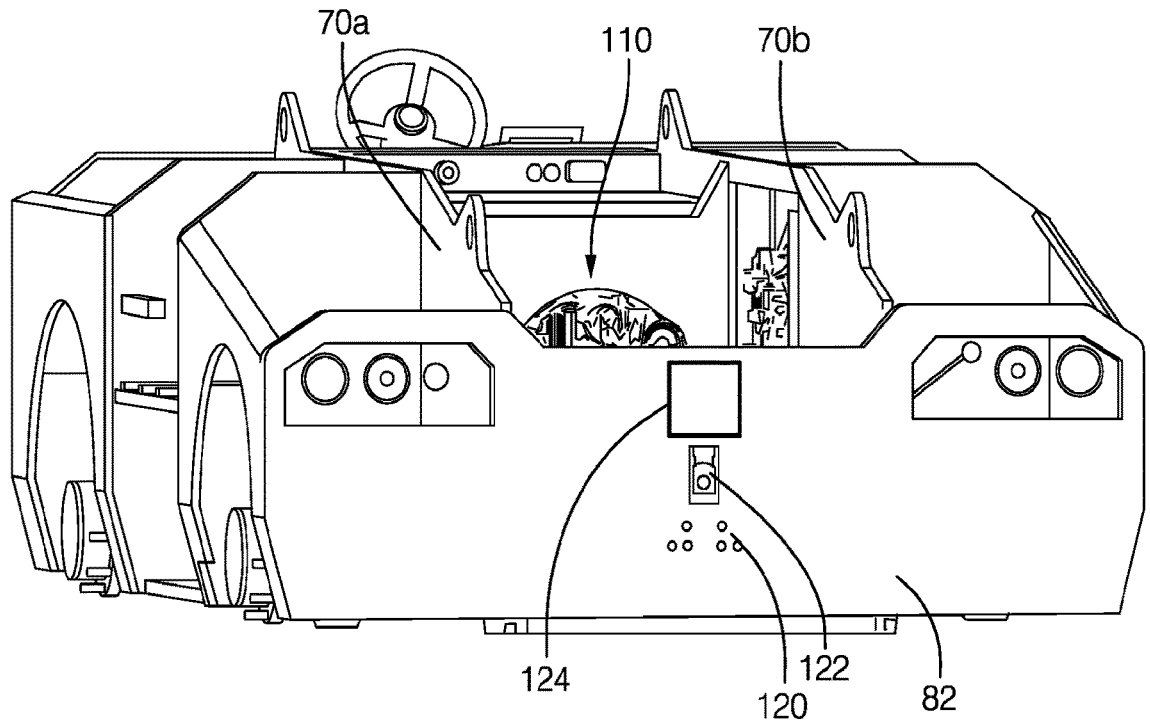
FIG. 9 is a rear view of a frame of an electric pushback tractor according to some embodiments.
Figure 10:
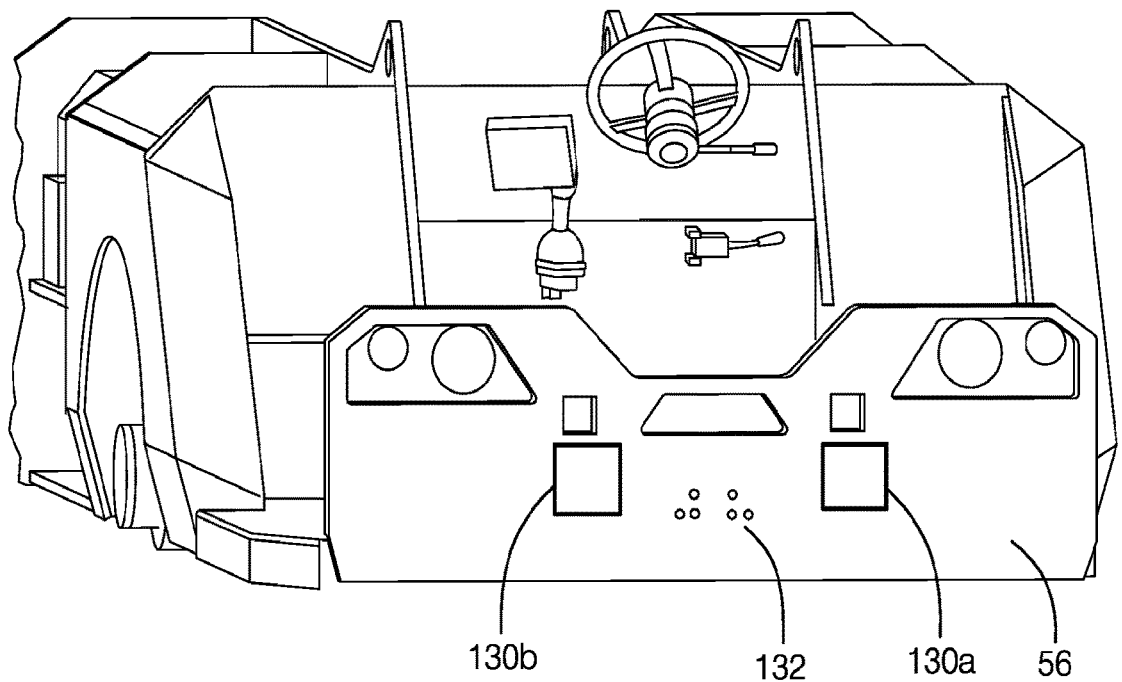
FIG. 10 is a front view of a frame of an electric pushback tractor according to some embodiments.
Figure 11:
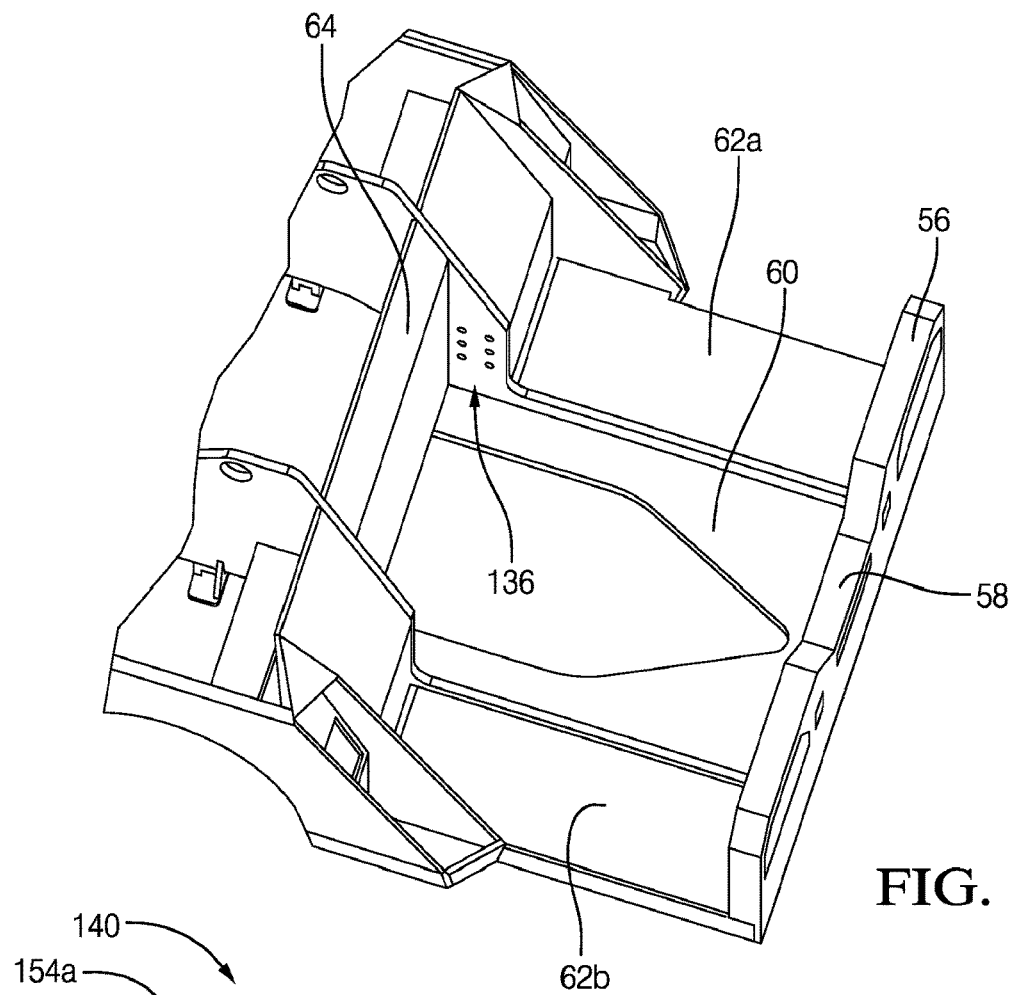
FIG. 11 is a perspective view of a front frame portion of an electric pushback tractor according to some embodiments.

Referring now to FIGS. 9 and 10, rear and front views of the pushback vehicle are shown. In some embodiments, rear bulkhead 82 includes a location 120 including bolt holes for receiving a rear hitch attachment, a camera 122, and a charging port 124. In some embodiments, camera 122 is connected to a display located in the operator cab 12 to allow the operator the location of the hitch with respect to a vehicle/aircraft to be towed. Similarly, front bulkhead 56 includes a location 132 including bolt holes for receiving a front hitch attachment, and first and second charging ports 130a, 130b.

Figure 12:
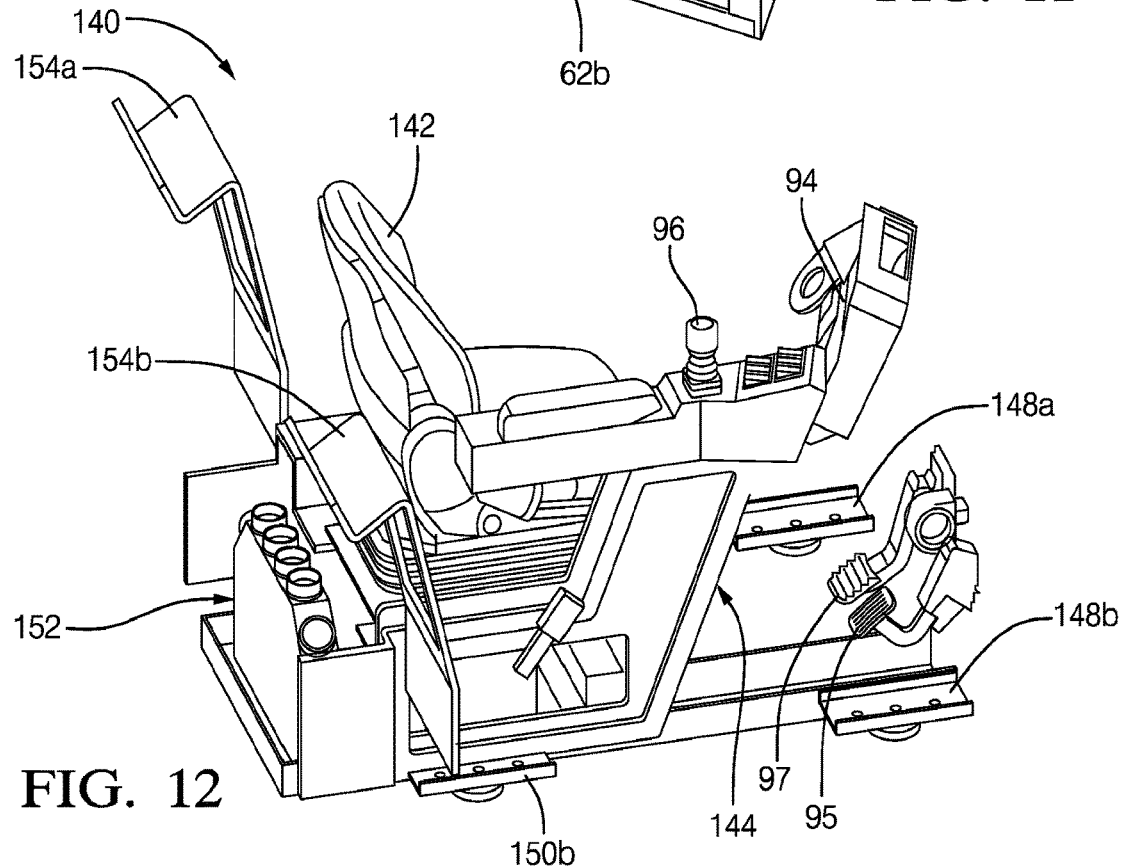
FIG. 12 is a rear perspective view of an operator station according to some embodiments.
Figure 13:
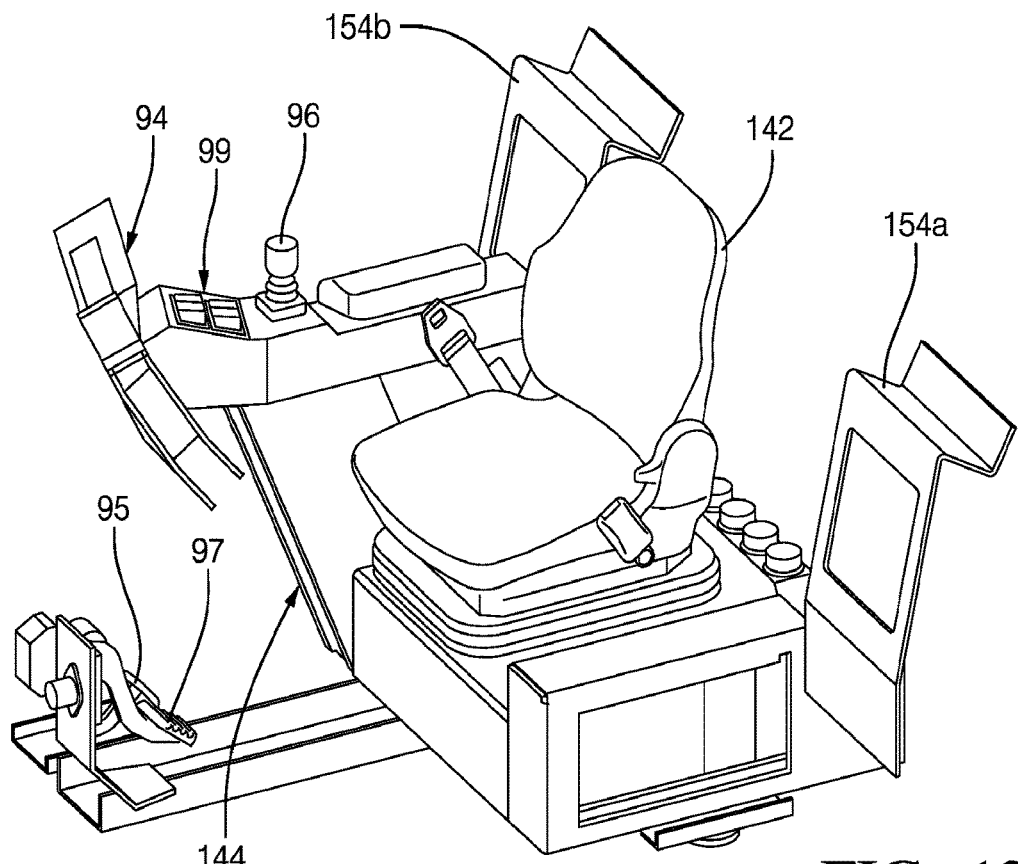
FIG. 13 is a front perspective view of the operator station according to some embodiments.
Figure 14:
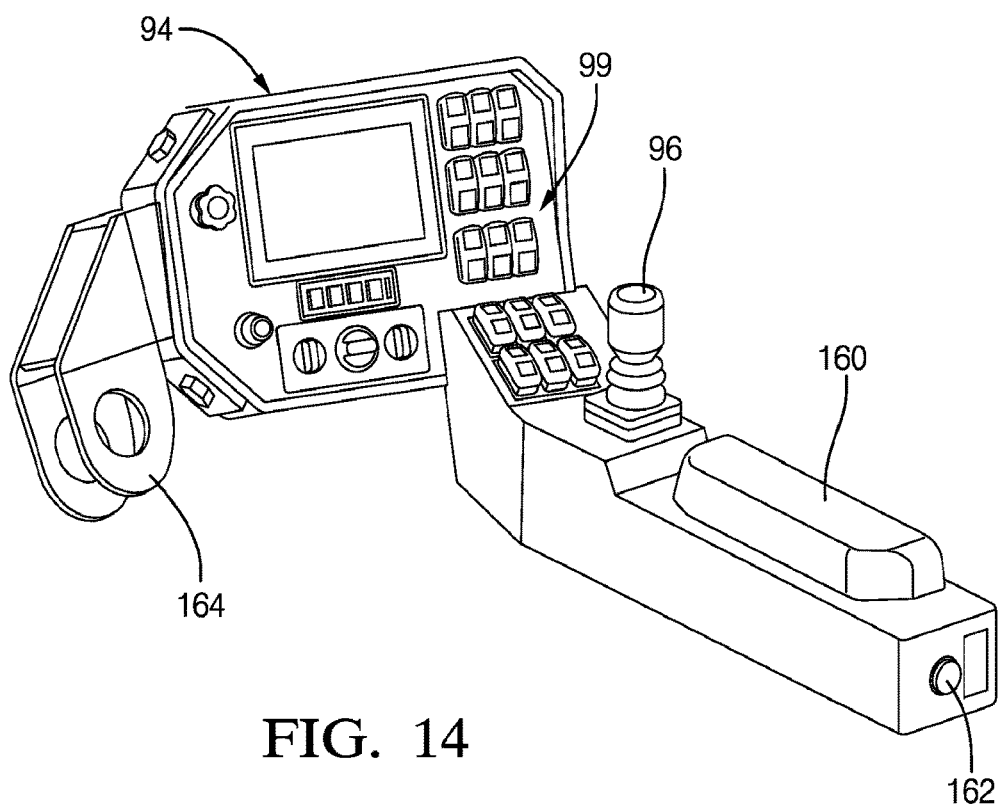
FIG. 14 is a view of the operator display/control panel according to some embodiments.

Referring to FIGS. 12-14, the interior of the operator cab 12 is shown according to various embodiments. For example, the interior of the operator cab 12 includes operator station 140. In some embodiments, operator station 140 includes operator seat 142, cantilevered control panel 144, a plurality of mounts 148a, 148b, 150, and 150b for mounting the operator station 140 to the center member 60 of front frame 52. In some embodiments, the operator station 140 is mounted to center member 60 and is cantilevered to provide the operator with additional legroom/space.

In some embodiments, the cantilevered control panel 144 includes a steering wheel 92, display 94, joystick 96, and input controls 99. In some embodiments, input controls 99 include one or more of a parking brake switch, emergency pump motor switch, 4WD/2WD selector switch, parking lights/headlights switch, high beam/low beam switch, hazard light switch, beacon light switch, work light switch, a gear selector switch and/or a direction selector switch. In some embodiments, input controls 99 generate an electrical signal in response to actuation (i.e., switching). In addition, gas pedal 95 and brake pedal 97 may be configured to generate an electrical signal in response to actuation. In some embodiments, each of these provides an electrical signal in response to actuation control by the operator. Control signals are routed to a vehicle master controller (described with respect to FIG. 24) via output port 162 (shown in FIG. 14). For example, in response to the operator turning the steering wheel 92 a signal is generated quantifying the degree of turning requested by the operator. The vehicle master controller receives the input from one or more of the steering wheel 92, gas pedal 95, brake pedal 97, joystick 96, gear selector, and/or direction selector and generates a control signal. The control signal may be provided to one or more of a steer cylinder, a brake cylinder, or the motor controller. In some embodiments, because no mechanical effort is required to turn the wheels, steering wheel 92 may be replaced by joystick 96. In other embodiments, both steering wheel 92 and joystick 96 may be utilized in conjunction with one another to generate control signals. In some embodiments, the steering wheel generates control signals for steering and the joystick generates control signals for operator gear selection. In some embodiments, contradictory control signals are resolved by the vehicle master controller. For example, in some embodiments the steering wheel, gas pedal 95 and/or brake pedal 97 may be utilized at higher speeds and the joystick may be utilized at lower speeds to align the rear hitch and/or forward hitch of the vehicle with an aircraft.

With respect to FIG. 14 the cantilevered control panel 144 includes a display 94, a steering wheel mount 164 for receiving a steering wheel 92, and joystick 96. In some embodiments, the display 94 is connected to display images captured by rear camera 122. In other embodiments, display 94 may be utilized to display other information to the operator, including battery status, speed, warnings, etc. In some embodiments, the cantilevered control panel 144 includes a steering wheel mount 164. As discussed above, steering wheel may be configured to provide an electrical control signal to control the orientation of the ground engaging members 14. As a result, no mechanical linkage is required between the steering wheel and ground engaging members and steering wheel 92 may be mounted to steering wheel mount 164.

Figure 15:
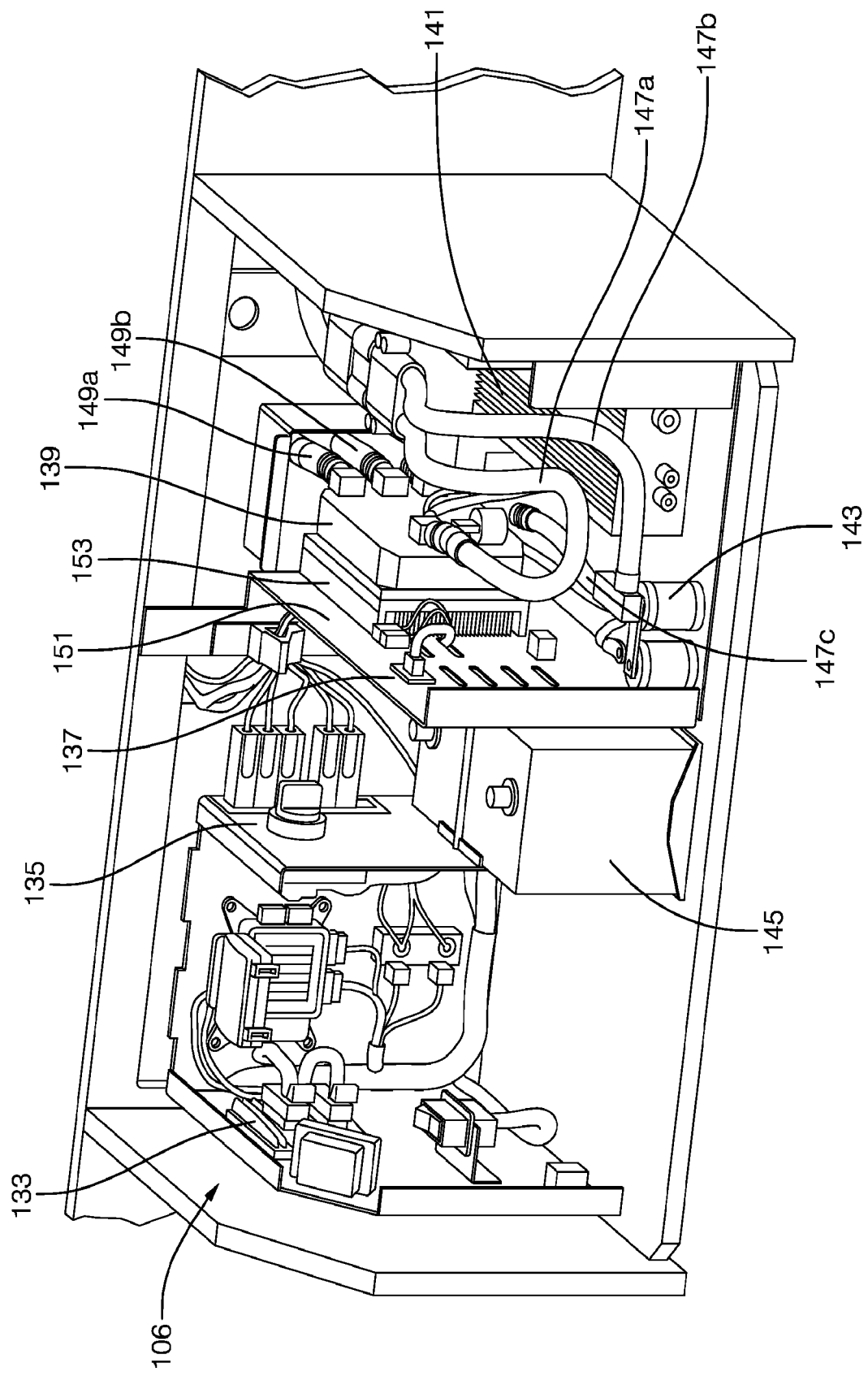
FIG. 15 is a view of the electrical maintenance compartment of the electric pushback tractor according to some embodiments.

Referring to FIG. 15, an alternative configuration of electrical maintenance compartment 106 is provided. In this embodiments, electrical maintenance compartment 106 includes vehicle motor controller 133, 12-volt cutoff switch 135, battery sense port 137, motor controller 139, DC-to-DC converter 141, and charge port disconnect 143. In some embodiments, electrical maintenance compartment 106 includes one or more interior mounts/walls 151 for dividing the interior space of electrical maintenance compartment 106. In addition, the components remain easily accessible to technicians. In some embodiments, motor controller 139 is mounted along with heat sink 153 to interior mount 151. In some embodiments, DC power is provided via electric cables 147a, 147b, and 147c from traction battery 108 to motor controller 139, which selectively applies received DC power to electric motor 112 via electric cables 149a, 149b. As discussed above, in some embodiments motor controller 139 converts the DC power received from the traction battery 108 to an AC output provided to the electric motor 112. In some embodiments, motor controller 139 selectively applies the DC power received from the traction battery 108 directly to the electric motor 112. In the embodiment shown in FIG. 15, motor controller 139 is connected to traction battery 108 via charge port disconnect 143. In some embodiments, charging power is provided to traction battery 108 via charge port disconnect 143. In some embodiments, charge port disconnection prevents power from being provided to motor controller 139 during charging of traction battery 108.

In addition to power from traction battery being provided to electric motor 112 via motor controller 139, DC-to-DC converter 141 is connected to receive power from traction battery 108 and to convert the high voltage (e.g., 103V DC) to a 12V DC output that is provided to on-board electrical components, including 12V battery 145.

In the embodiment shown in FIG. 15, vehicle master controller 133, 12V cutoff switch 135, and 12V battery (among other components) are located on the opposite side of interior wall mount 151. In some embodiments, DC power is provided to the electrical components (either via 12V battery 145 or directly from DC-to-DC converter 141) via 12V cutoff switch 135 that allows the electrical components to be disconnected from DC power. In some embodiments, 12V cutoff switch 135 allows an operator to turn OFF power to these components during maintenance operations. In some embodiments, vehicle master controller 133 receives sensor inputs from a plurality of sources and generates a plurality of outputs. For example, as described in more detail with respect to FIG. 24, vehicle master controller 133 may include inputs from the operator located in the operator cab 12 and may generate outputs to control various aspects of the pushback tractor including outputs provided to control the operation of motor controller 139, steering, brakes, etc.

In some embodiments, battery sense port output 137 is configured to allow an operator to retrieve information provided by traction battery 108. For example, as described with respect to FIG. 6 above, traction battery 108 includes a plurality of sensor ports 109 configured to transmit information regarding the status of the traction battery. In some embodiments, sensor receive inputs from th fa DC-to-DC converter 136 is utilized to convert DC power received from the traction battery 108 (e.g., 103V DC) to a 12V DC output for provision to on-board electrical components, including 12V battery 132.

In some embodiments, DC power is provided from traction battery 108 to motor controller 139 via charge port disconnect 143. In some embodiments, motor controller 130 selectively applies to the DC power to the electric motor 112. In some embodiments, motor controller 130 converts the DC power received from the traction battery 108 to an AC output provided to the electric motor 112. In addition, high voltage DC (HVAC) provided by traction battery 108 may be provided to DC-to-DC converter 136, which converts the HVDC to a lower voltage DC output (e.g., 12V) for provision to on-board electrical components, including 12V battery 132. In addition, in some embodiments a plurality of sense ports 109 associated with traction battery 108 are connected via one or more communication cables to the sense port output 137 located in electrical maintenance compartment 106 to allow status/diagnostic information from the traction battery 108 to be accessible within the electrical maintenance compartment 106. In some embodiments, communication between sense port output 137 and traction battery 108 is via a controller area network (CAN) bus. For example, in one embodiment a diagnostic tool could be plugged into sense port output 137 to retrieve/write battery management system (BMS) settings associated with the traction battery 108. In some embodiments, BMS settings may include fault settings, warning settings, battery attributes. For example, fault state thresholds retrieved/written as part of the BMS settings may include charge overcurrent thresholds, discharge overcurrent thresholds, over-temperature thresholds, undervoltage thresholds, and overvoltage thresholds. Depending on the system requirements, thresholds may be modified by an operator/technician via sense port output 137. In addition, other thresholds associated with one or more of low-voltage thresholds, high-voltage thresholds, charge-overcurrent thresholds, discharge-overcurrent thresholds, low temperature thresholds, and high temperature thresholds may be retrieved/written via sense port output 137. In addition, an operator/technician may activate/deactivate the battery (e.g., sleep mode) via sense port output 137. In some embodiments, a number of additional BMS settings may be retrieved/written via sense port output 137, including one or more of battery voltage, minimum cell voltage, maximum cell voltage, current, charge current limit, discharge current limit, nominal capacity, average pack temperature, minimum temperature, maximum temperature, state of charge, depth-of-discharge, etc. In some embodiments, sense port output 137 may also be utilized to activate/deactivate traction battery 108—for example to ship the traction battery/vehicle. A benefit of providing sense port output 137 within the electrical maintenance compartment is it allows easy access to modifying/updating/retrieving BMS settings without requiring direct access of the traction battery 108 itself.

Figure 17:
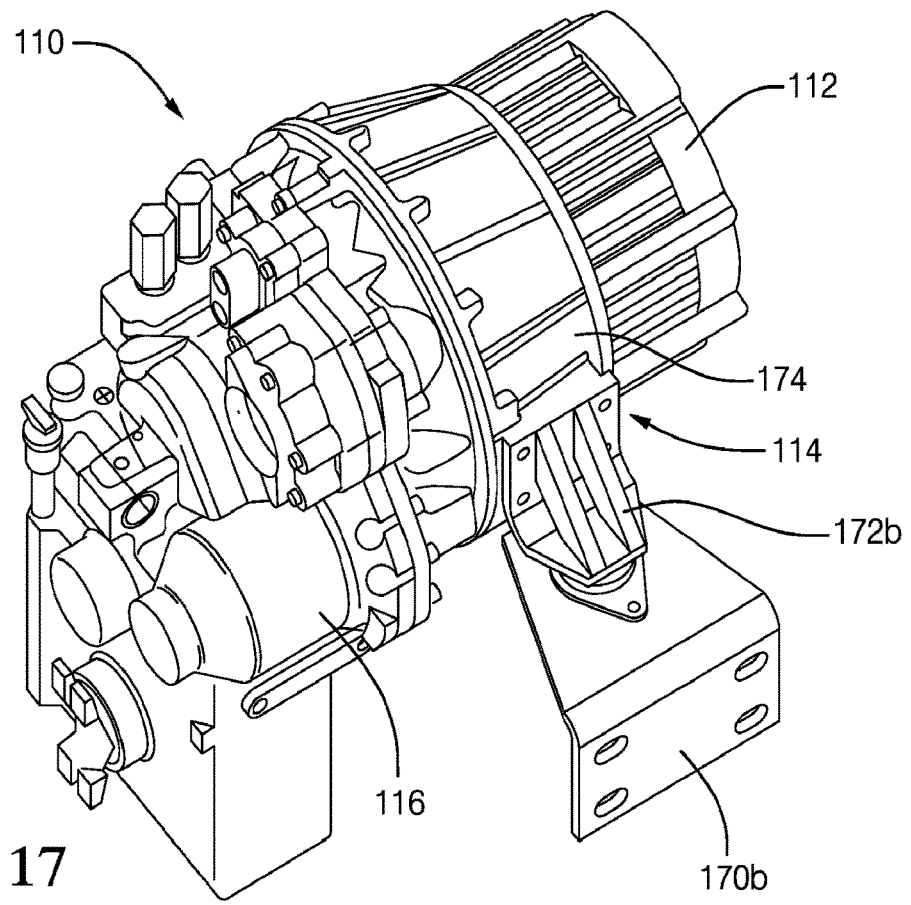
FIG. 17 is a perspective view of an electric motor, motor-transmission adapter, and transmission according to some embodiments.
Figure 18:
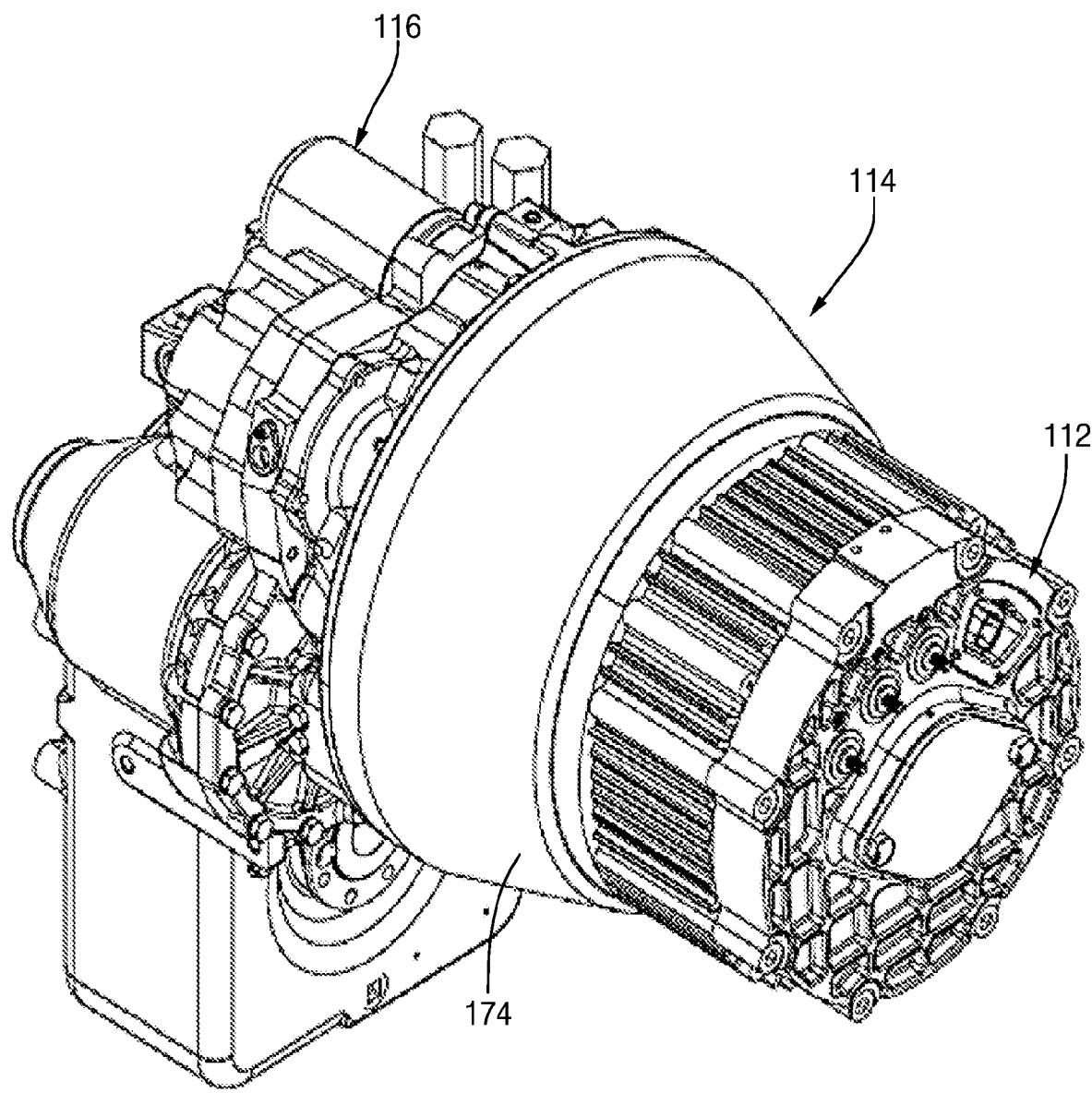
FIG. 18 is a perspective view of an electric motor, motor-transmission adapter, and transmission according to some embodiments.
Figure 19:
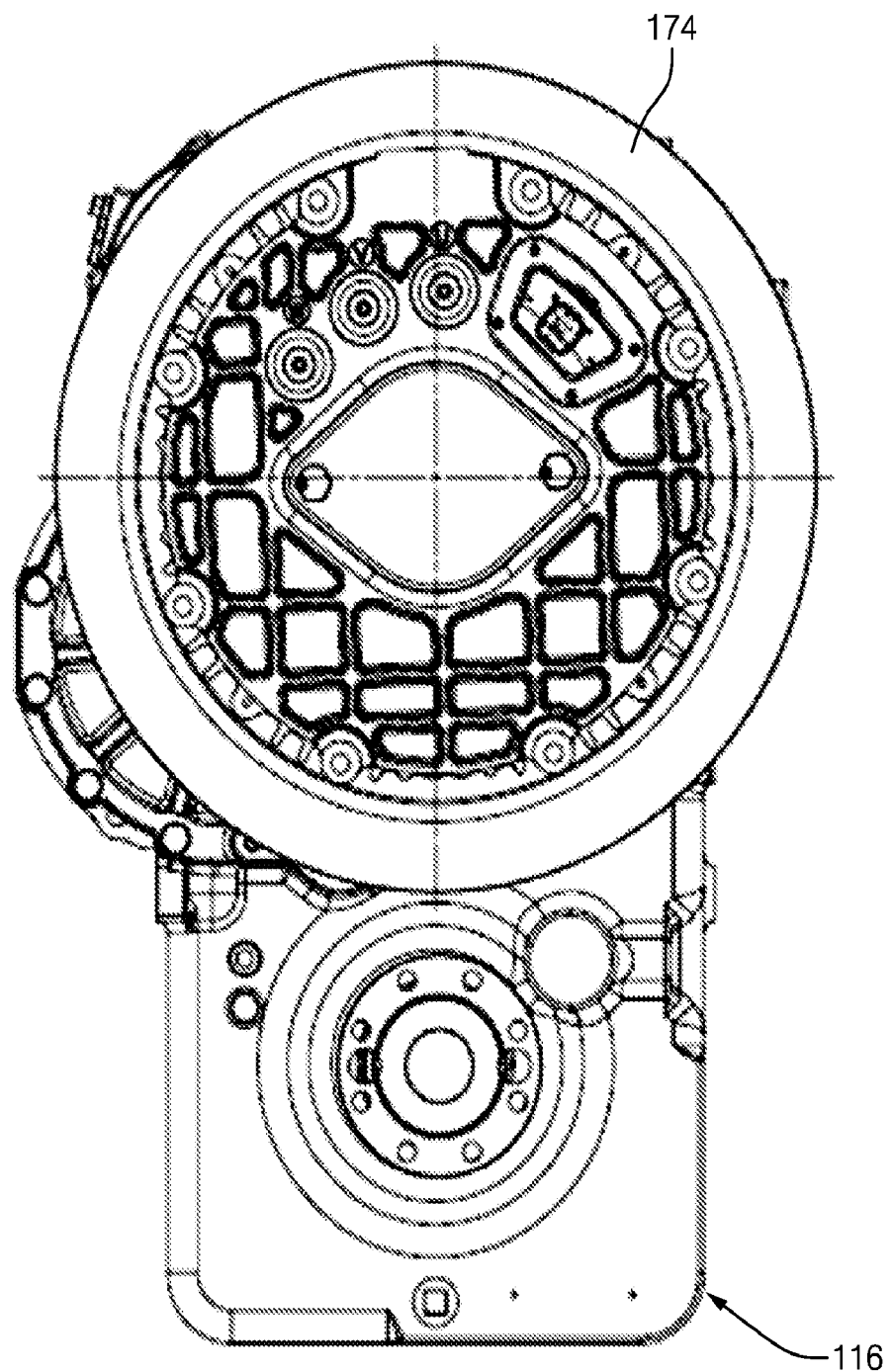
FIG. 19 is an end view of an electric motor, motor-transmission adapter, and transmission according to some embodiments.

With respect to FIGS. 17-19 the electric drive system 110 is provided, which includes electric motor 112, housing adapter 114 and transmission 116. In the embodiment shown in FIG. 17, the electric motor 112 is mounted to housing adapter 114, which houses the one or more adapters and/or components utilized to communicate power from the electric motor 112 to the transmission 116. In some embodiments, housing adapter 114 includes a bellhousing 174 and one or more brackets 170a, 170b and 172a, 172b utilized to mount the bellhousing 174 to the frame 50. As shown in FIG. 17, mount 170b includes mounting holes for mounting to longitudinal member 70b. Mount 170a (not visible in this view) would likewise include mounting holes for mounting to longitudinal member 70a. Mounting bracket 172b is coupled between mount 170b and the bellhousing 174 of housing adapter 114. In some embodiments, transmission 116 is mounted to the frame 50, including to cross member 74 located beneath the transmission 116.

As described above, electric motor 112 is coupled to receive electric power originating from the traction battery 108. In some embodiments, electric motor 112 is a brushed DC motor, a brushless DC motor, an induction motor, or other suitable electric motor type. A motor controller receives high voltage direct current (HVDC) (e.g., 103V) power from the traction battery 108 and selectively applies electric power to the electric motor 112—depending on the type of electric motor utilized. For example, the motor controller 130 may selectively apply the HVDC to the electric motor 112 (in the case of brushed and/or brushless DC motors) or may convert the HVDC input to an AC output for provision to the electric motor 112. In the latter example, the motor controller 130 may utilize solid-state switches to convert the DC input to an AC output having a desired position and/or frequency. In response to electrical power provided by the motor controller 130, electric motor 112 generates mechanical power that is delivered via one or more components and/or adapters located within the housing adapter 114 to transmission 116. As described in more detail below, in some embodiments a torque converter is connected between the electric motor 112 and the transmission 116. In some embodiments, transmission 116 is an automatic transmission that communicates power received from electric motor 112 to the front axle 100 and/or rear axle 102.

Figure 20:
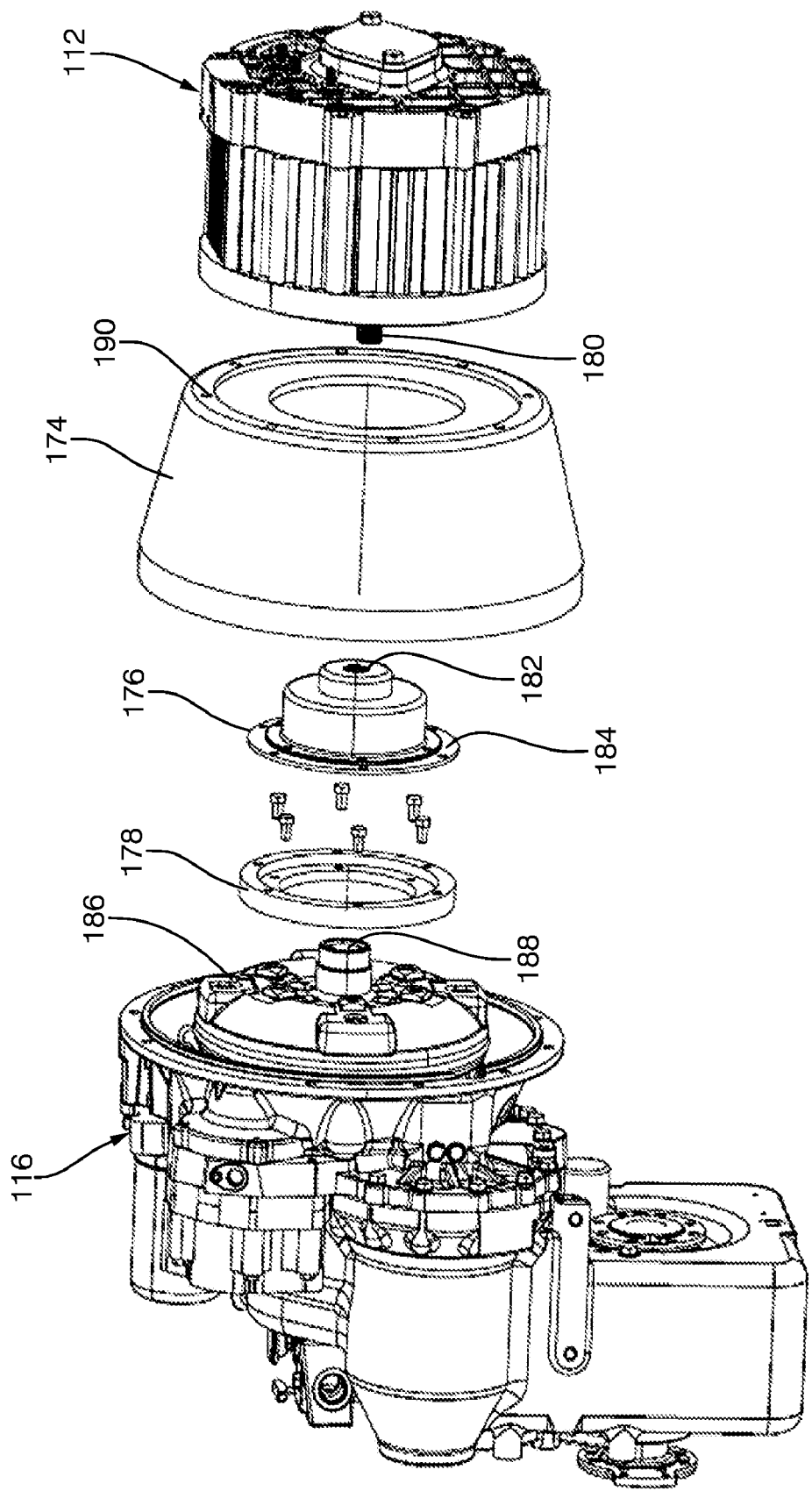
FIG. 20 is an exploded view illustrating the coupling of an electric motor to a transmission via a motor-transmission adapter according to some embodiments.
Figure 21:
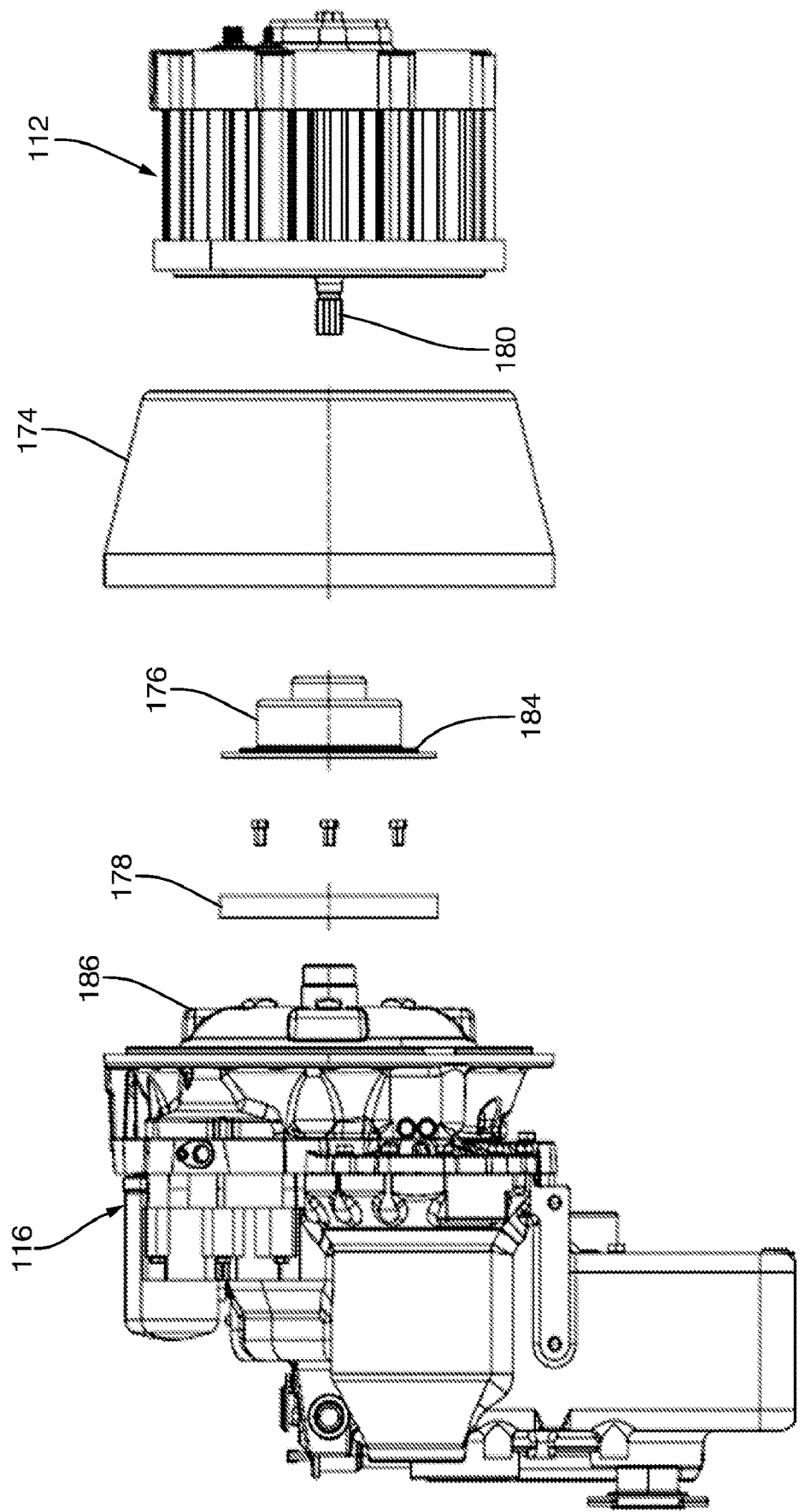
FIG. 21 is an exploded view illustrating the coupling of an electric motor to a transmission via a motor-transmission adapter according to some embodiments.
Figure 22A:
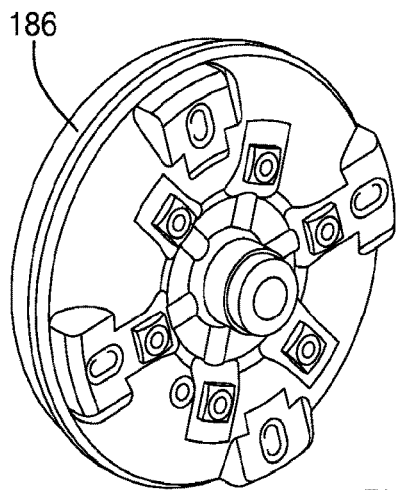
FIG. 22a is a perspective view of a torque coupler.
Figure 22B:
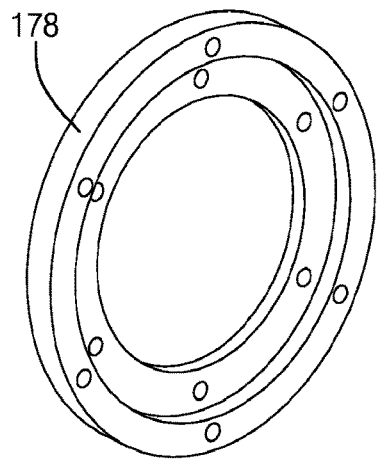
FIG. 22b is a perspective view of an adapter ring.
Figure 22C:
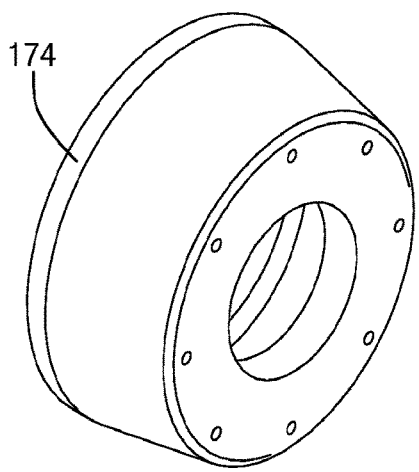
FIG. 22c is a perspective view of a bellhousing.
Figure 22D:
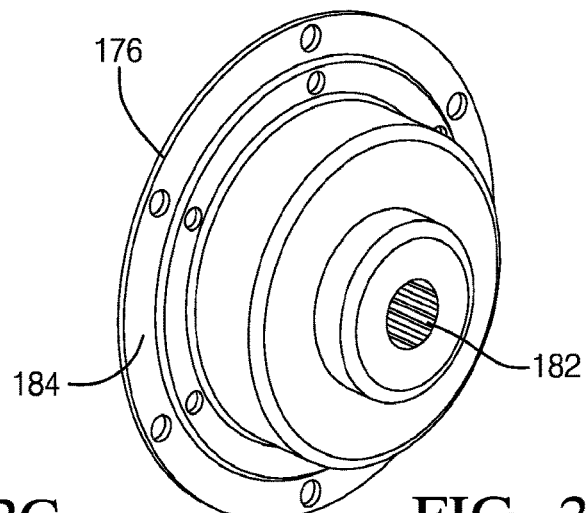
FIG. 22d is a perspective view of a flange.
Figure 22E:
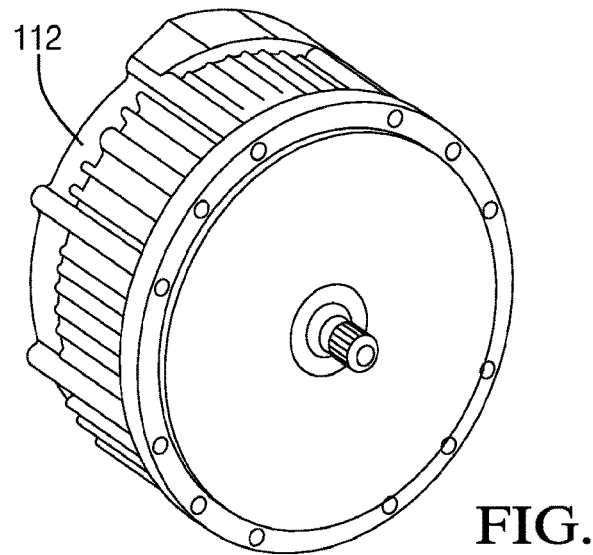
FIG. 22e is a perspective view of an electric motor.

Referring to 20-22e, the components housing within the housing adapter 114 are illustrated according to some embodiments. As shown in FIG. 20, these components may include flange coupler 176, adapter ring 178, and torque converter 186. As shown in FIG. 20, bellhousing 174 includes a plurality of bolt holes 190 located on a surface facing electric motor 112 to allow electric motor 112 to be coupled directly to bellhousing 174. Coupling the electric motor 112 directly to bellhousing 174 provides a more economical design.

Mechanical power developed by electric motor 112 is provided through output shaft 180 to flange coupler 176. In some embodiments, output shaft 180 includes an outer spline surface (i.e., male spline) that interfaces with an inner spline surface (i.e., female spline) 182 associated with flange coupler 176 to communicate motive force from the output shaft 180 to the flange coupler 176. An outer diameter of flange coupler 176 includes mounting holes for mounting the flange coupler 176 to the adapter ring 178, which in turn is mounted to torque converter 186. Adapter ring 178 is utilized to allow flange coupler 176 to be coupled to torque converter 186, but in other embodiments flange coupler 176 may be mounted directly to torque converter 186. In some embodiments, the torque converter 186 includes a first portion and a second portion, wherein the first portion is coupled to receive motive force provided from the electric motor 112 and the second portion is fluidly coupled to the first portion. The transmission is 116 is coupled to the second portion of the torque converter 186. In some embodiments, a benefit of coupling the electric motor 112 to the transmission 116 through a torque converter 186 is the torque multiplication provided by the torque converter 186 at very low RPMs (i.e., when accelerating from zero mph). In some embodiments, the torque multiplication provided by the torque converter at zero to low RPMs allows a smaller electric motor to be utilized. In some embodiments, torque converter 186 and transmission 116 may be used in conjunction with a typical gas combustion engine. A benefit of this design is that a pushback tractor utilizing the driveline shown in FIGS. 20-22e may utilize either a combustion engine as the prime move or an electric motor and battery system. In addition, the pushback tractor may subsequently be modified from a combustion engine to an electric motor (or vice versa) based on the application without having to modify the transmission and driveline from the transmission to the ground engaging members.

In some embodiments, mechanical power is provided by the electric motor 112 in one direction only. In particular, in embodiments in which electric motor 112 is connected to the transmission 116 via a torque converter 186, then electric motor 112 will only provide rotational energy in one direction. The ability to change directions (e.g., forward, reverse) is provided by the transmission 116. However, in other embodiments electric motor 112 may be connected directly to transmission 116, in which case electric motor 112 may be controlled to provide rotational energy in one direction or another, depending on the desired direction of the vehicle.

In some embodiments, mechanical power provided by the electric motor 112 to the transmission 116 through a torque converter 186 is utilized to drive one or more pumps utilized to provide hydraulic/transmission fluid to the transmission 116. For example, in some embodiments an outer case or first portion of the torque converter 186 mechanically coupled to the electric motor 112 is keyed to a pump utilized to provide hydraulic/transmission fluid to the transmission 116. In this way, hydraulic/transmission fluid is provided by the pump even during idle, prior to engagement of the transmission 116. This is in contrast with direct drive systems in which the electric motor 112 is connected directly to the transmission 116 without a torque converter. Without a torque converter, power provided by the electric motor 112 is immediately provided to the transmission 116 prior to lubrication being provided by the pump (i.e., no idle condition). Inclusion of the torque converter 186 allows the one or more pumps associated with the transmission 116 (e.g., automatic transmission) to be running and providing lubrication prior to the transmission being engaged. Alternatively, in embodiments in which the electric motor 112 is coupled directly to the the transmission 116 (without the presence of the torque converter 186) then an external pump such as an electrically driven pump may be included to provide hydraulic/transmission fluid to the transmission 116.

FIGS. 22a-22e illustrate the various components, including the torque converter 186, adapter ring 178, bell housing 174, flange 176 and electric motor 112. In some embodiments, torque converter 186 includes a standard bolt pattern utilized to couple a transmission to a combustion engine. In some embodiments, flange coupler 176 is a flexible flange (e.g., elastomer material). A benefit of utilizing a flexible material such as elastomer for the flange coupler 176 is it provides compensation for misalignment between the electric motor 112 and the torque converter 186 and/or transmission 116.

Figure 23A:
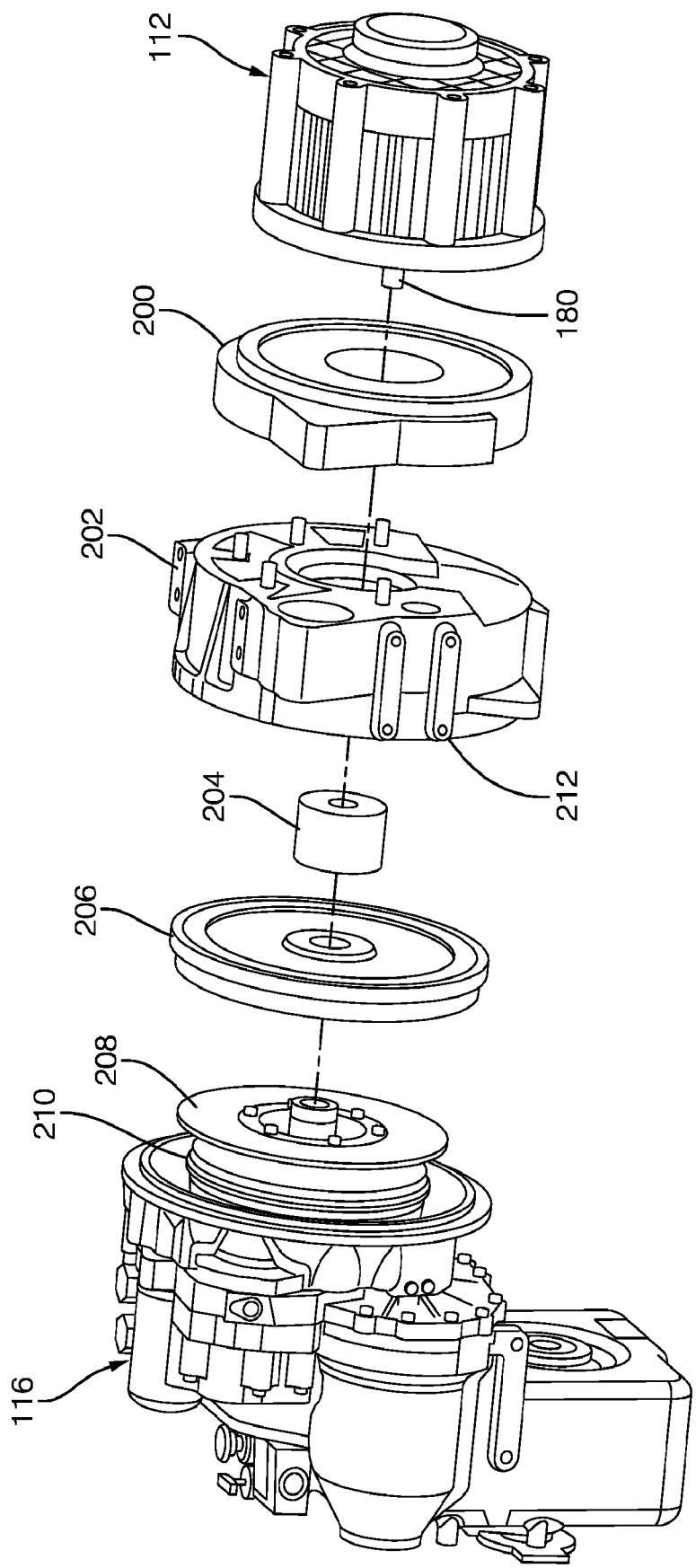
FIGS. 23a-23f is an exploded view illustrating the coupling of an electric motor to a transmission via a motor-transmission adapter according to some embodiments.
Figure 23B:
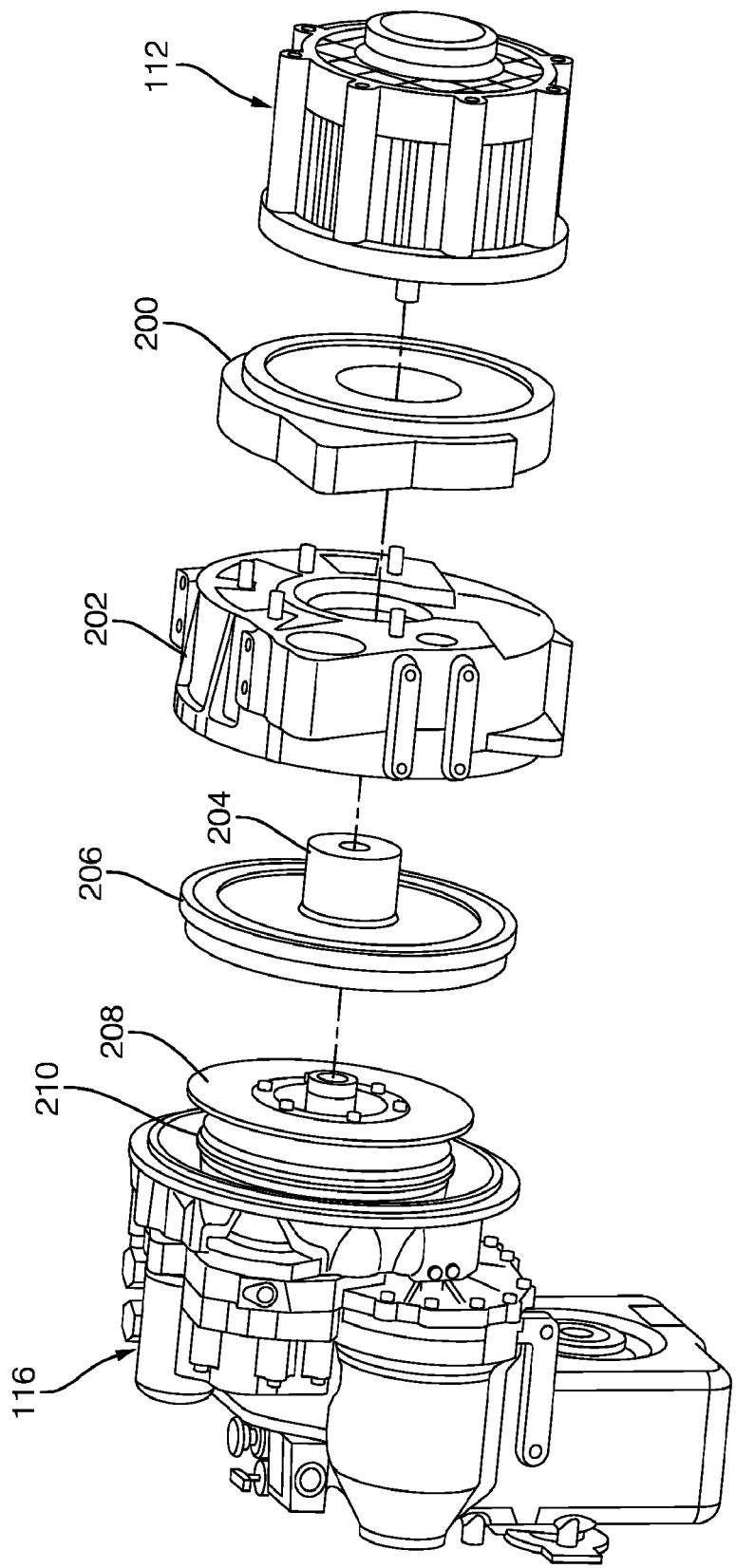
Figure 23C:
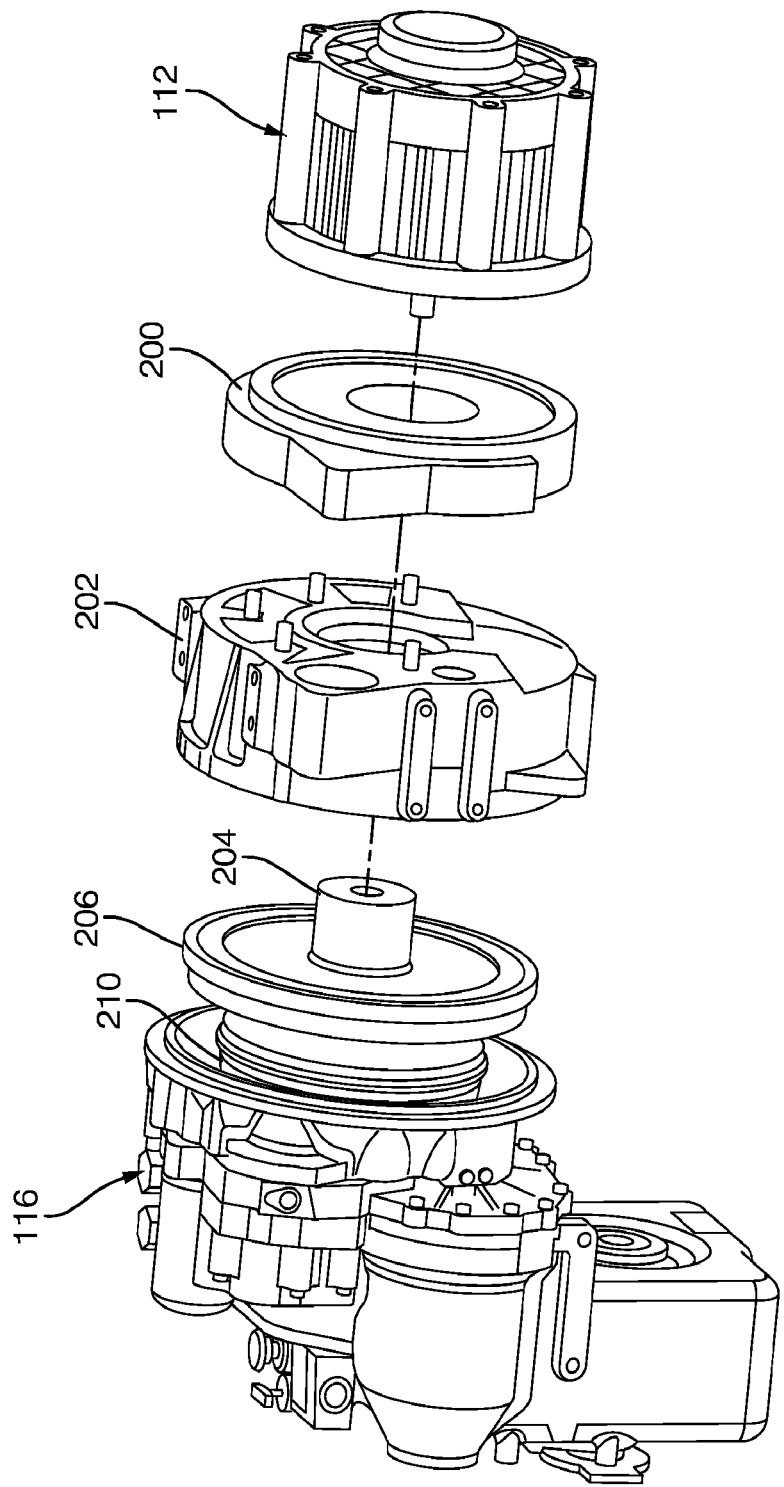
Figure 23D:
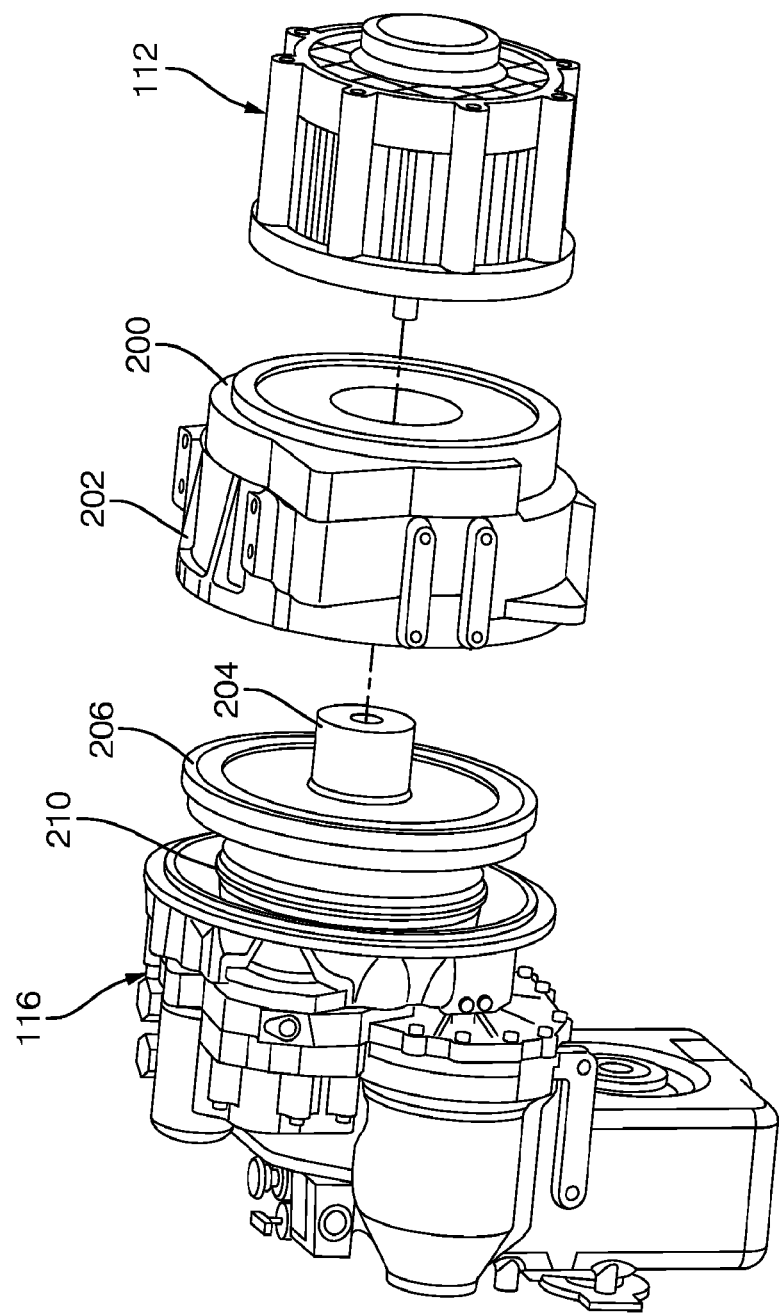
Figure 23E:
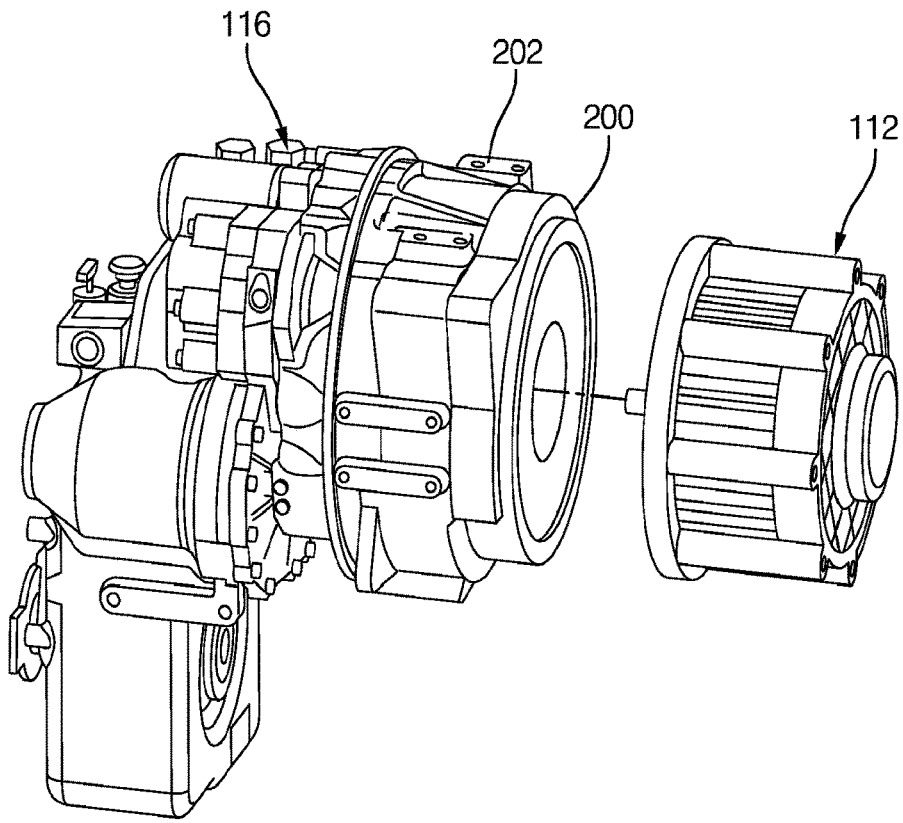
Figure 23F:
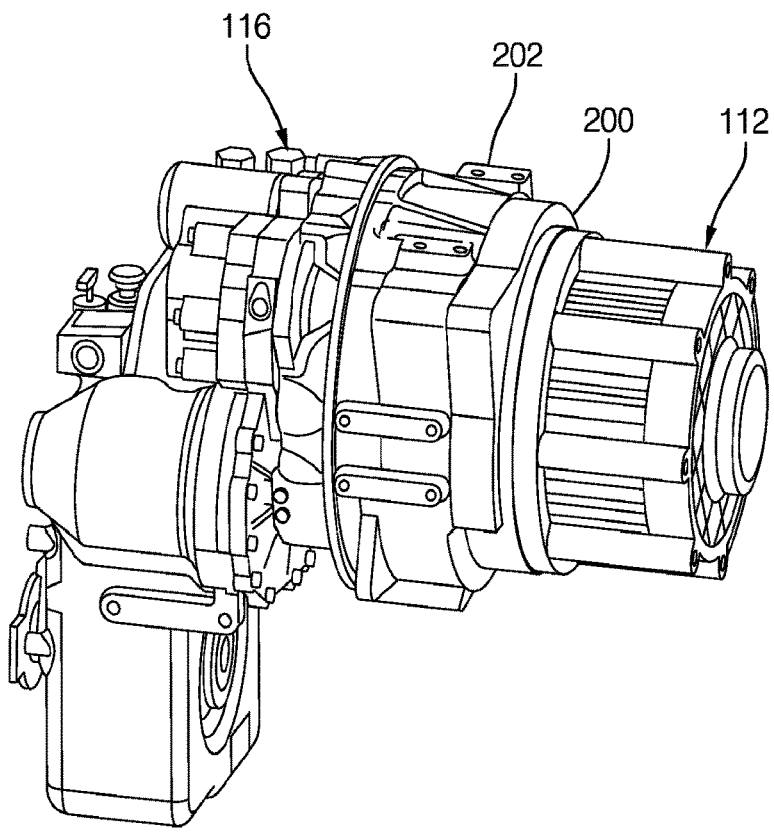

Referring to FIGS. 23a-23f, various components utilized to provide power from electric motor 112 to transmission 116 according to another embodiment. In some embodiments, coupling plate 200 is affixed to bellhousing 202 (as shown in FIG. 23d). Bellhousing 202 is affixed to transmission 116, wherein bellhousing 202 houses coupling plate 206 and torque converter 210. In the embodiment shown in FIGS. 23a, 23f, bellhousing 202 is coupled to the frame 50 via a plurality of bolt holes 212 to provide a rigid connection of the bellhousing 202 to the frame 50. Spline shaft 204 is coupled to the output shaft 180 of electric motor 112 and in turn is affixed to coupling plate 206 as shown in FIG. 23b. Coupling plate 206 is affixed to torque converter 210 via interfacing plate 208 as shown in FIG. 23c. In this way, motive force provided via output shaft 180 is communicated via spline shaft 204 to coupling plate 206 and torque converter 210.

Figure 24:
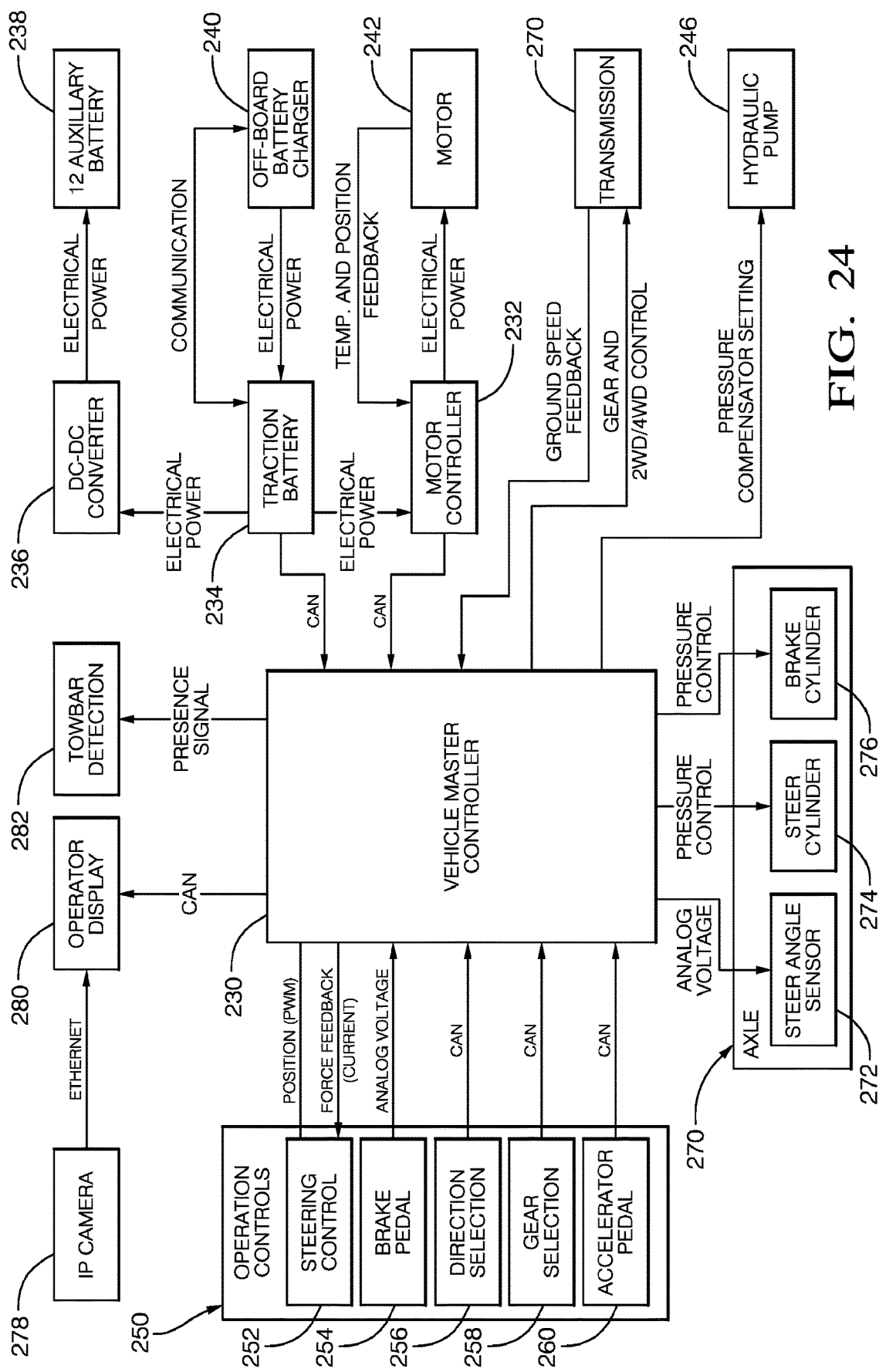
FIG. 24 is a schematic diagram illustrating auxiliary power, traction power, hydraulic power, and mechanical power.

Referring to FIG. 24, a block diagram of the electrical/control system utilized by the traction vehicle according to some embodiments. In some embodiments, the vehicle master controller 230 receives inputs from sensors located around the vehicle and provides outputs, including outputs provided to the operator and/or outputs for controlling one or more functions.

For example, in the embodiment shown in FIG. 24, vehicle master controller 230 is configured to receive operator inputs 250, which may include steering control 252, brake pedal 254, direction selection 256, gear selection 258 and accelerator pedal 260. As described previously, in some embodiments the steering wheel, brake pedal and accelerator pedal are not mechanically and/or hydraulically connected to the respective wheels, brakes and/or engine accelerator. Steering control 252 includes a signal describing the actuation of the steering wheel. In some embodiments, feedback may be provided to the operator to indicate that the extent of the turn radius has been reached. Similarly, the brake pedal 254 and accelerator pedal 260 are provided in response to the operator actuating the respective pedals. Direction selection 256 and gear selection 258 may be incorporated together and may include forward, reverse, and one or more gears. In some embodiments, direction selection 256 and/or gear selection 258 input may be provided via one or more switches located on the cantilevered control panel 144 (e.g. the joystick). In some embodiments, the vehicle master controller can override the operator gear selection and output its own gear selection based on other input signals from the vehicle (e.g. towbar sensor, motor current draw, ground speed sensor). For example, the vehicle master controller receives an input from the operator to select a high speed gear, but outputs a signal instructing the transmission to shift into a low speed gear when the vehicle senses a heavy load situation (e.g. towing an aircraft).

In response to received operator inputs 250, vehicle master controller 230 generates a number of outputs. For example, in response to an accelerator pedal input 260 the vehicle master controller 230 may generate a control signal communicated to motor controller 232 instructing the motor controller 232 to provide power to electric motor 242. Likewise, in response to a brake pedal input 254 the vehicle master controller 230 may generate a pressure control signal provided to brake cylinder 276 to actuate the brakes. Likewise, in response to a steering control input 252 the vehicle master controller 232 provides a pressure control signal to steer cylinder 274 to provide the desired actuation of the wheels. These inputs may be digital signal communicated via a well known communication bus such as a controller area network (CAN) bus. In other embodiments inputs and outputs may be provided as analog signals. Likewise, as discussed above, in some embodiments vehicle master controller 230 may override a received operator input 250. For example, in response to an input received from towbar detection sensor 282, an operator input 250 that instructs the vehicle to continue in reverse or accelerate in reverse may be overridden. Likewise, an operator gear selection (e.g., high gear) may be overridden based on sensor input (e.g., towbar sensor, motor current drawn, ground speed sensor) indicating that the vehicle is in a heavy load (e.g., aircraft towing) situation.

In some embodiments, motor controller 232 is in bi-directionally communication with vehicle master controller 230. Motor controller 232 receives HVDC power from the traction battery and selectively provides electrical power to motor 242. In some embodiments, motor controller 232 monitors the electric motor 242 via one or more sensors, including temperature sensors and/or position sensors. For example, position feedback provided by the electric motor 242 (and/or position sensors associated with the electrical motor) may be utilized by the motor controller to control the application of power to the electric motor (e.g., position feedback utilized in induction motors to generate an AC output having a proper position relative to the eclectic motor). In response to AC power selectively applied by motor controller 232 to electric motor 242, mechanical power is provided to transmission 244 and in turn to the ground engaging members of the vehicle. Vehicle master controller 230 may monitor the transmission 244 to receive ground speed feedback and may provide control signals to the transmission 244 to select the direction and/or gear associated with the transmission 244. For example, for electric motors 242 coupled to the transmission 244 via a torque coupler, forward and reverse is implemented by the transmission 244 in response to control signals received from the vehicle master controller 230. In addition, mechanical power provided to transmission 244 may be utilized to drive hydraulic pump 246. In addition to supplying power to motor controller 232, traction battery 234 provides HVDC power to DC-DC converter 236, which converts the HVDC (e.g., 103V) to 12V DC power for provision to 12V auxiliary batter 238.

Figure 8:
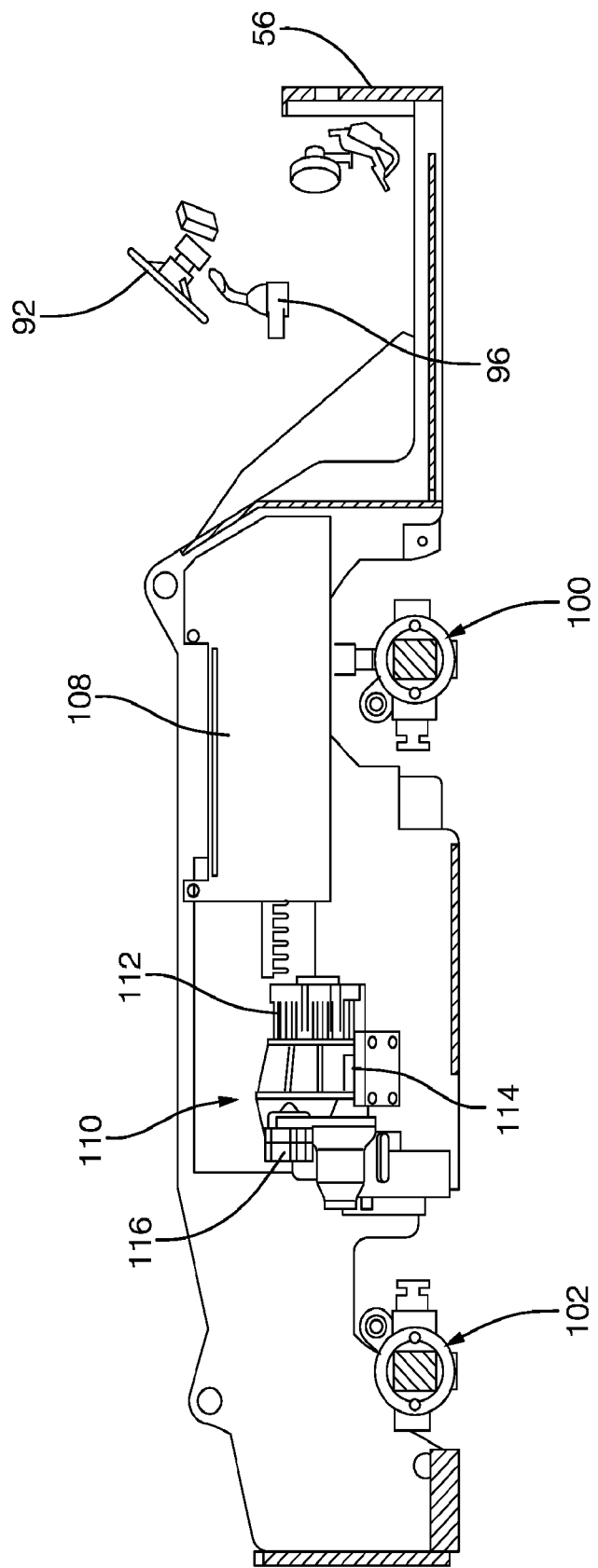
FIG. 8 is a side view of the frame and internal components of the electric pushback tractor with a passenger side of the frame removed to show the electric motor and transmission according to some embodiments.

In some embodiments, traction battery 234 is charged via an off-board battery charger 240. In some embodiments, off-board battery charger 240 is configured to plug into a port located on the pushback tractor. For example, FIG. 8 illustrated a charging port 124 located on a rear side of the pushback tractor; and FIG. 9 illustrates charging ports 130a, 130b located on the front of the pushback tractor. In some embodiments, bi-directional communication is provided between the traction battery 234 and off-board battery charger 240. For example, in some embodiments the charging profile utilized to charge traction battery 234 is non-linear and depends on the charge status of the traction battery 234.

In some embodiments, vehicle master controller also receives one or more sensor inputs configured to aid the operator in aligning the pushback tractor with the aircraft to be towed/pushed. For example, in some embodiments, an IP camera 278 is configured to provide visual input to an operator display 280 located in the operator cab. In some embodiments, video input is also provided to vehicle master controller 230, which may analyze the input video to make determinations regarding distance from the rear hitch to the towbar, object detection/avoidance, etc. In some embodiments, analysis of the video input by the vehicle master controller 230 is utilized to generate one or more alerts provided to the operator. These may include audio alerts, visual alerts, etc. For example, an alert may be provided based on detected distance from the rear hitch to the towbar. In other embodiments, alerts may be provided based on the detection of objects. In other embodiments, either in conjunction with alerts or independent of alerts, vehicle master controller 230 may utilize the video input provided by the IP camera 278 to control the operation of the pushback tractor. For example, in response to a determination that the rear hitch is in close proximity to the towbar based on analysis of the video input, the vehicle master controller 230 may generate a control signals to slow/stop the pushback tractor. These may include control signals provided to the brake cylinder 276 and/or to motor controller 232.

In some embodiments, either alone or in combination with the IP camera 278, a towbar detection sensor 282 may provide input to the vehicle master controller 230. In some embodiments, toward detection 282 utilizes a proximity sensor that detects either contact or close contact of the rear hitch and/or front hitch with a towbar. As discussed with respect to IP camera 278, in some embodiments the input received from towbar detection 282 is utilized to generate alerts provided to the operator. In other embodiments, the input received from towbar detection 282 is utilized to generate control signals to slow/stop the pushback tractor. These may include control signals provided to the brake cylinder 276 and/or to motor controller 232.

Figure 25A:
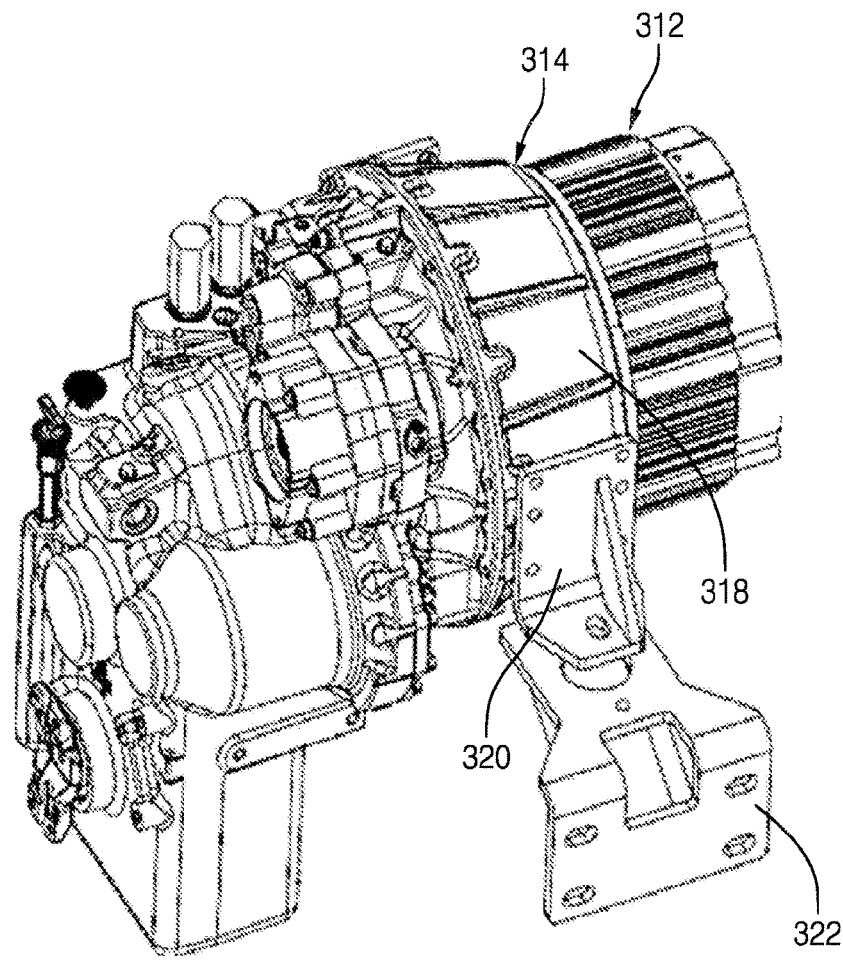
FIG. 25A is a perspective view of an electric motor, motor-transmission adapter, and transmission according to some embodiments.
Figure 25B:
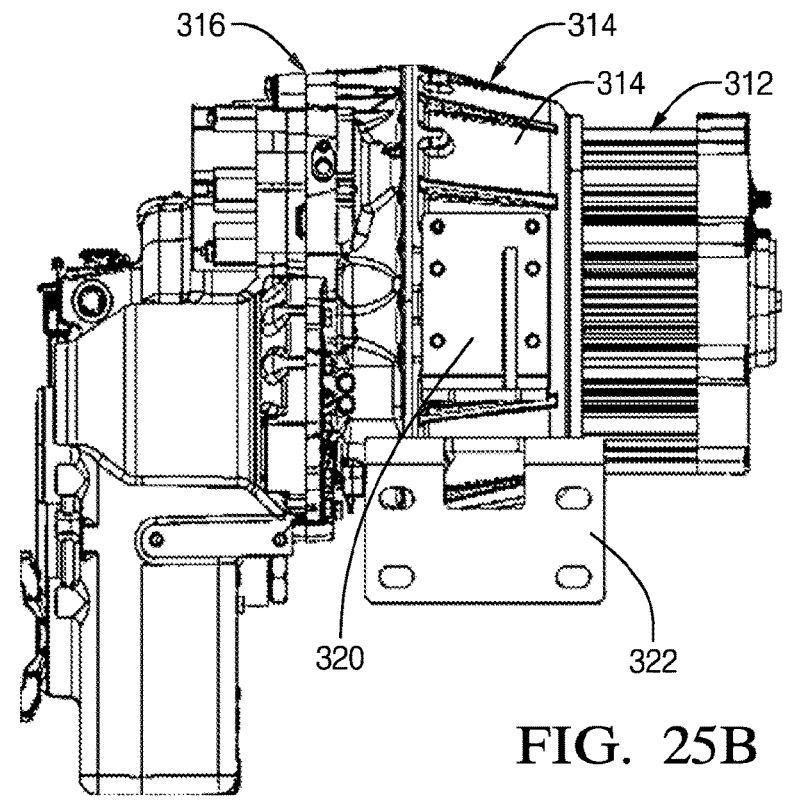
FIG. 25B is a side view of the electric motor, motor-transmission adapter, and transmission according to some embodiments.
Figure 25C:
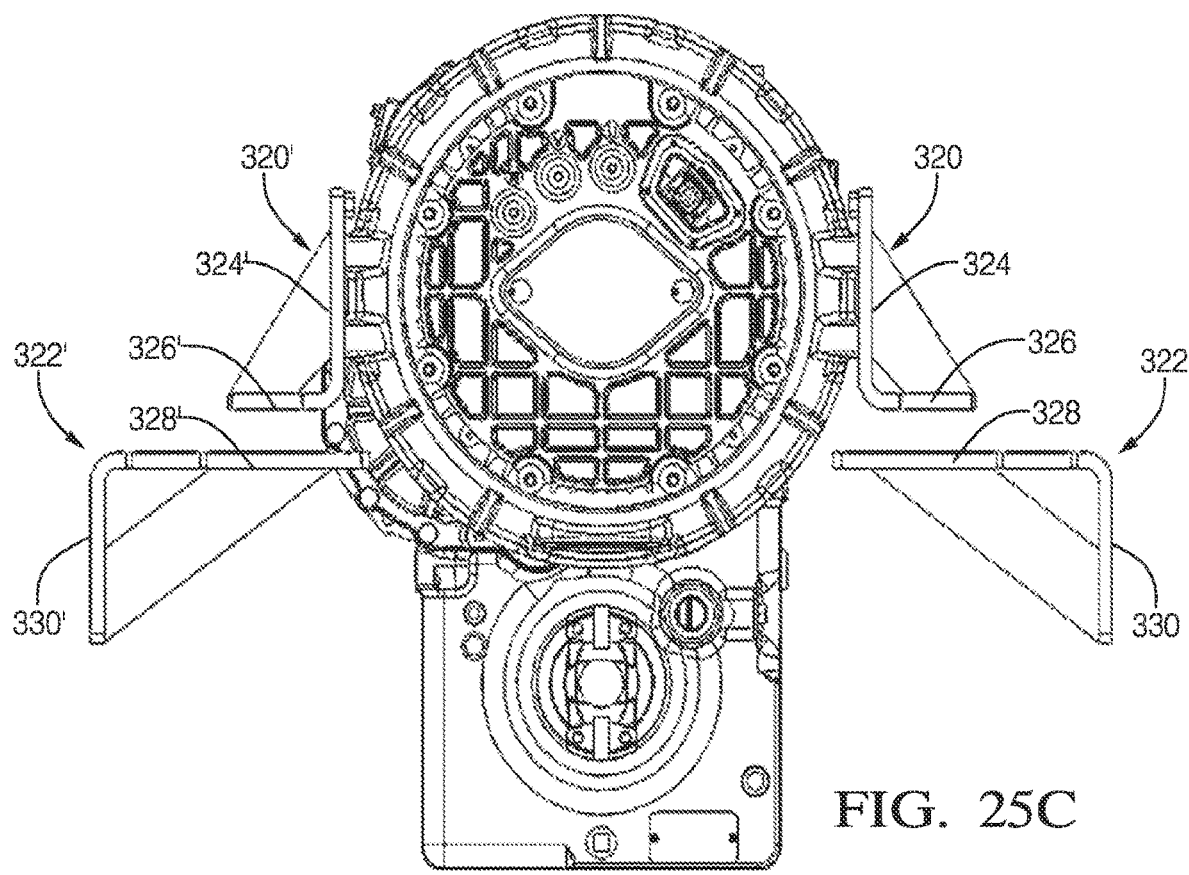
FIG. 25C is an end view of the electric motor, motor-transmission adapter, and transmission according to some embodiments.

With respect to FIGS. 25A-25C an electric drive system 300 is provided, which includes electric motor 312, housing adapter 314 and transmission 316. FIG. 25A is a perspective view of the electric system 300, FIG. 25B is a side view of the electric drive system 300 and FIG. 25C is an end view of the electric drive system 300.

In some embodiments, the electric motor 312 is affixed to housing adapter 314, which houses the one or more components that mechanically couple the electric motor 312 to the transmission 316. In some embodiments, L-shaped brackets 320 and 322 are utilized to mount the electric drive system 300 to the frame of the vehicle. In some embodiments, housing adapter 314 includes a bellhousing cover 318 as well as a number of internal components (shown in more detail in FIGS. 26A-26C). In some embodiments, L-shaped brackets 320 and 322 are located on both sides of the bellhousing cover 318. For example, in the embodiment shown in FIG. 25C, L-brackets 320 and 322 are shown on one side and L-brackets 320' and 322' are located on the opposite side. The vertical portion 324 (and 324') of L-shaped bracket 320 (and 320') is affixed to the bellhousing cover 318. The horizontal portion 326 (and 326') extends away from bellhousing cover 318 and is affixed to the horizontal portion 328 (and 328') of L-shaped bracket 322 (and 322'). The vertical portion 330 (and 330') of L-shaped bracket 322 (and 322') is affixed to the frame of the vehicle. In some embodiments, L-shaped brackets 320 and 322 are mounted to the bellhousing cover 318 via a plurality of bolts. Likewise, L-shaped brackets 320 and 322 may be bolted to one another and to the frame. In some embodiments, transmission 316 is also mounted to the frame. For example, in some embodiments the transmission 316 may be mounted to a cross-member located underneath the transmission 316.

Figure 16:
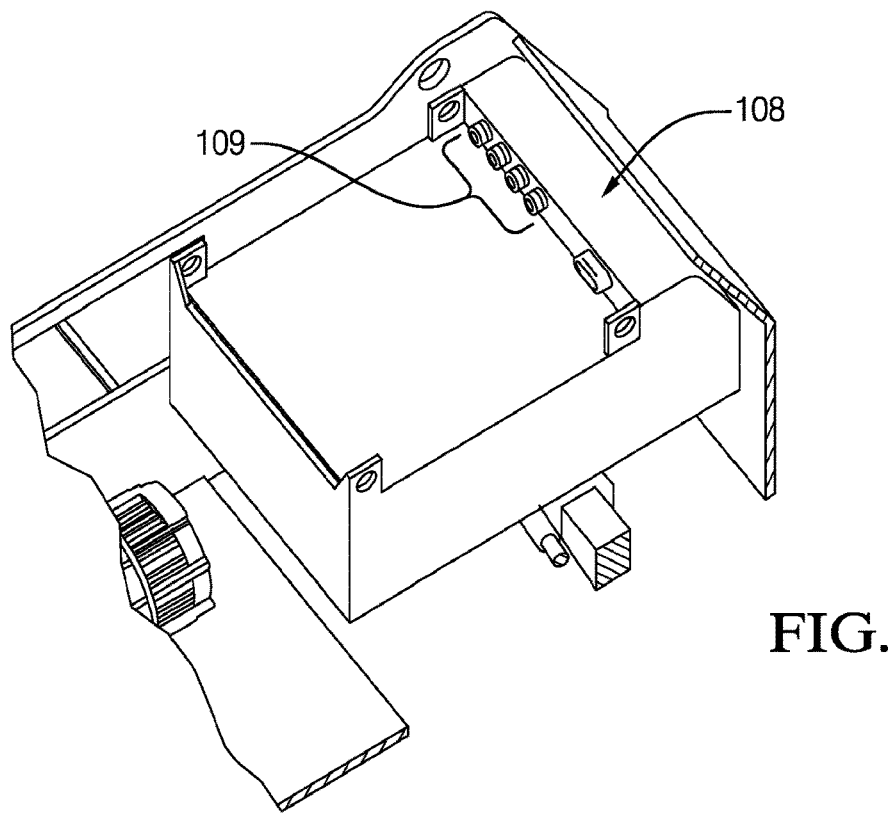
FIG. 16 is a perspective view of a traction battery system employed on the electric pushback tractor according to some embodiments.

As described above, electric motor 312 is coupled to receive electric power originating from the traction battery 108 (shown in FIG. 16, for example). In some embodiments, electric motor 312 is a brushed DC motor, a brushless DC motor, an induction motor, or other suitable electric motor type. A motor controller receives high voltage direct current (HVDC) (e.g., 103V) power from the traction battery 108 and selectively applies electric power to the electric motor 312—depending on the type of electric motor utilized. For example, the motor controller 130 (shown in FIGS. 5 and 6, for example) may selectively apply the HVDC to the electric motor 312 (in the case of brushed and/or brushless DC motors) or may convert the HVDC input to an AC output for provision to the electric motor 312. In the latter example, the motor controller 130 may utilize solid-state switches to convert the DC input to an AC output having a desired position and/or frequency. In response to electrical power provided by the motor controller 130, electric motor 312 generates mechanical power that is delivered via one or more components located within the housing adapter 314 to transmission 316. As described in more detail below, in some embodiments a torque converter is connected between the electric motor 312 and the transmission 316. In some embodiments, transmission 316 is an automatic transmission that communicates power received from electric motor 312 to the front axle 100 and/or rear axle 102.

Figure 26A:
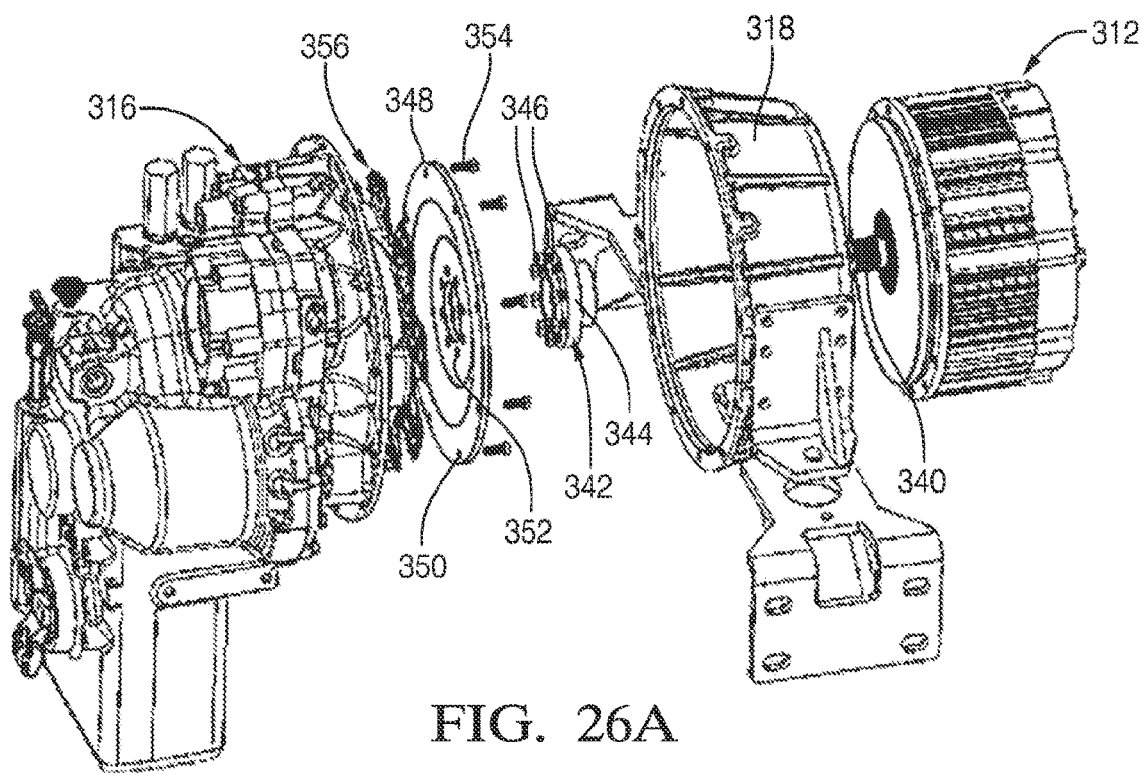
FIGS. 26A-26C are exploded views illustrating the coupling of an electric motor to a transmission via a motor-transmission adapter according to some embodiments.
Figure 26B:
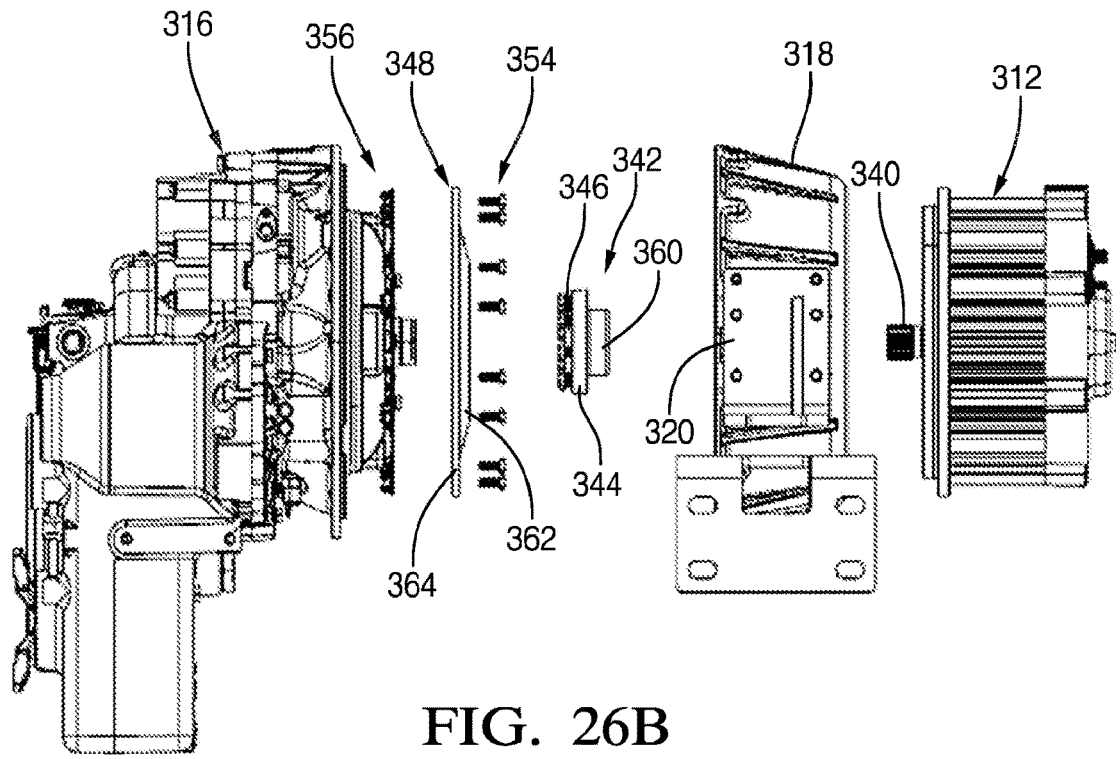
Figure 26C:
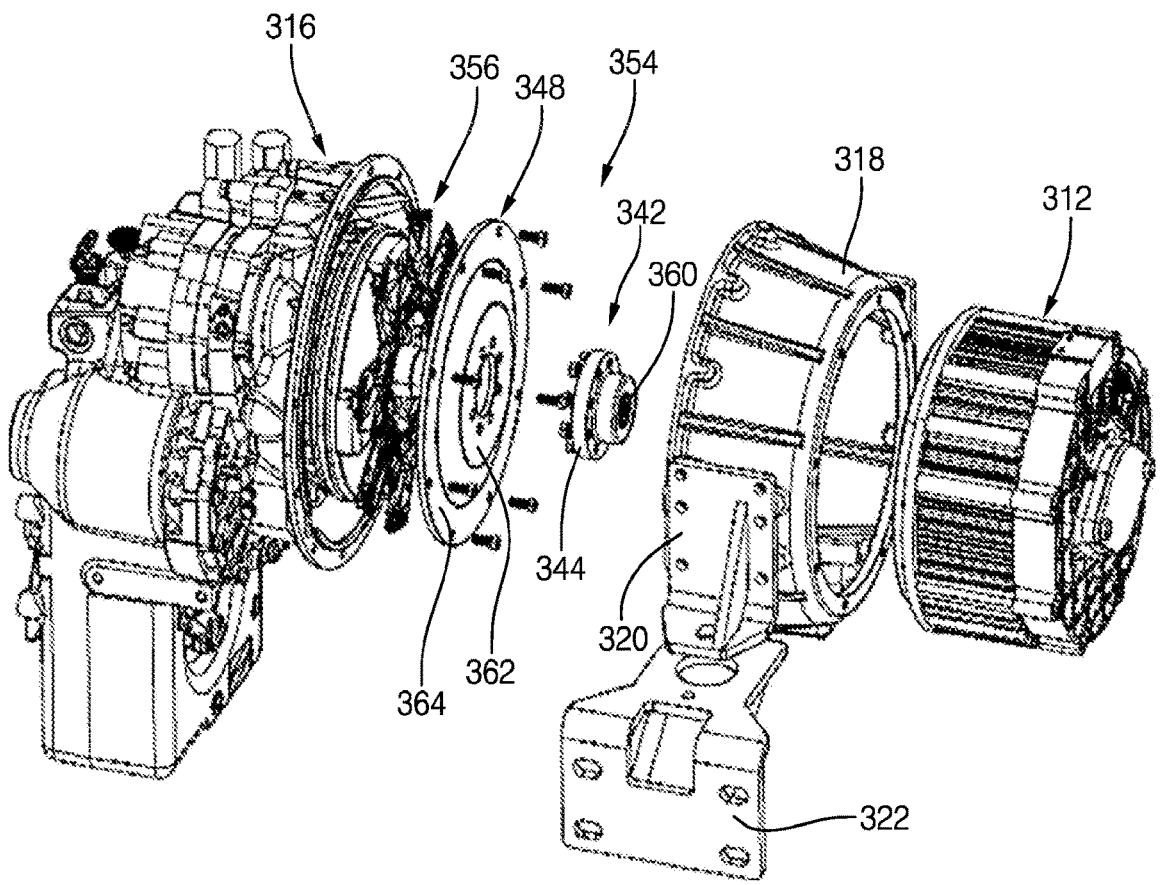

Referring to 26A-26C, the components housed within the housing adapter 314 are illustrated according to some embodiments. As shown in FIG. 26A, these components include comprises flange coupler 342, adapter ring 348, and torque converter 356. As shown in FIG. 26A, bellhousing 318 includes a plurality of bolt holes located on a surface facing electric motor 312 to allow electric motor 312 to be coupled directly to bellhousing 318. Coupling the electric motor 312 directly to bellhousing 318 provides a more economical design.

Mechanical power developed by electric motor 312 is provided through output shaft 340 to flange coupler 342. In some embodiments, output shaft 340 includes an outer spline surface (i.e., male spline) that interfaces with an inner spline surface (i.e., female spline) 360 associated with flange coupler 342 to communicate motive force from the output shaft 340 to the flange coupler 342. An outer diameter 344 of flange coupler 342 includes mounting holes 346 for mounting the flange coupler 342 to the adapter ring 348, which in turn is mounted to a plurality of a plurality of fingers 357 associated with torque converter 356. In some embodiments, the outer diameter 344 of flange coupler 342 is coupled to an inner diameter 362 of adapter ring 348—for example via one or more fasteners or bolts. Likewise, the outer diameter 364 of adapter ring 348 is coupled to the distal end of fingers 357. The proximal or inner portion of fingers 357 are coupled to torque converter 356. In some embodiments, fingers 357 act to provide flexing during operation such that any misalignment between adapter ring 348 and torque converter 356 is accounted for and does not result in undesirable side loading of corresponding bearings and/or seals (not shown). In some embodiments, adapter ring 348 is utilized to allow flange coupler 342 to be coupled to torque converter 356, but in other embodiments flange coupler 342 may be mounted directly to torque converter 356. In some embodiments, the torque converter 356 includes a first portion and a second portion, wherein the first portion is coupled to receive motive force provided from the electric motor 312 and the second portion is fluidly coupled to the first portion. The transmission is 316 is coupled to the second portion of the torque converter 356. In some embodiments, a benefit of coupling the electric motor 312 to the transmission 316 through a torque converter 356 is the torque multiplication provided by the torque converter 356 at very low RPMs (i.e., when accelerating from zero mph). In some embodiments, the torque multiplication provided by the torque converter at zero to low RPMs allows a smaller electric motor to be utilized. In some embodiments, torque converter 356 and transmission 316 may be used in conjunction with a typical gas combustion engine. A benefit of this design is that a pushback tractor utilizing the driveline shown in FIGS. 26A-26C may utilize either a combustion engine as the prime move or an electric motor and battery system. In addition, the pushback tractor may subsequently be modified from a combustion engine to an electric motor (or vice versa) based on the application without having to modify the transmission and driveline from the transmission to the ground engaging members.

In some embodiments, mechanical power is provided by the electric motor 312 in one direction only. In particular, in embodiments in which electric motor 312 is connected to the transmission 316 via a torque converter 356, then electric motor 312 will only provide rotational energy in one direction. The ability to change directions (e.g., forward, reverse) is provided by the transmission 316. However, in other embodiments electric motor 312 may be connected directly to transmission 316 (i.e., not through a torque converter).

In some embodiments, mechanical power provided by the electric motor 312 to the transmission 316 through a torque converter 356 is utilized to drive one or more pumps utilized to provide hydraulic/transmission fluid to the transmission 316. For example, in some embodiments an outer case or first portion of the torque converter 356 mechanically coupled to the electric motor 312 is keyed to a pump utilized to provide hydraulic/transmission fluid to the transmission 316. In this way, hydraulic/transmission fluid is provided by the pump even during idle, prior to engagement of the transmission 316. This is in contrast with direct drive systems in which the electric motor 312 is connected directly to the transmission 316 without a torque converter. Without a torque converter, power provided by the electric motor 312 is immediately provided to the transmission 316 prior to lubrication being provided by the pump (i.e., no idle condition). Inclusion of the torque converter 356 allows the one or more pumps associated with the transmission 316 (e.g., automatic transmission) to be running and providing lubrication prior to the transmission being engaged. Alternatively, in embodiments in which the electric motor 312 is coupled directly to the the transmission 316 (without the presence of the torque converter 356) then an external pump such as an electrically driven pump may be included to provide hydraulic/transmission fluid to the transmission 316.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electric pushback vehicle comprising:
a frame having a forward portion and a rear portion;
a front drive axle configured to communicate power to ground engaging members;
a rear drive axle configured to communicate power to ground engaging members;
a traction battery;
an electric motor having an output shaft, wherein the electric motor is configured to rotate the output shaft in response to power received from the traction battery;
a transmission configured to communicate mechanical power generated by the electric motor to one or more of the front drive axle and the rear drive axle;
a bellhousing coupled to the transmission, the bellhousing including a first end having an aperture configured to receive the output shaft of the electric motor and a second end configured to be secured to the transmission;
a torque converter connected to communicate mechanical power generated by the electric motor to the transmission; and
one or more components configured to connect the output shaft of the electric motor to the torque converter, wherein the one or more components include:
a flange coupler that includes a female spline configured to receive a male spline on the output shaft; and
an adapter ring connected to the flange coupler and to the torque converter to provide power from the output shaft to the torque converter.

2. The electric pushback vehicle of claim 1, wherein the traction battery is secured to the frame over the front drive axle.

3. The electric pushback vehicle of claim 1, wherein the flange coupler is a flexible elastomer.

4. The electric pushback vehicle of claim 1, wherein the torque converter includes a plurality of fingers, wherein the adapter ring is coupled to the torque converter through the plurality of fingers.

5. The electrical pushback vehicle of claim 4, wherein an outer diameter of the adapter ring is coupled to a distal end of the plurality of fingers.

6. The electric pushback vehicle of claim 1, wherein the transmission is an automatic transmission.

7. The electric pushback vehicle of claim 6, wherein the torque converter includes a first side and a second side in fluid communication with the first side, the first side connected to receive power from the output shaft of the electric motor, wherein the first side is connected to provide power to a pump.

8. The electric pushback vehicle of claim 1, wherein the rear portion of the frame includes first and second longitudinally extending members.

9. The electric pushback vehicle of claim 8, wherein the traction battery is located along a longitudinal centerline of the electric pushback vehicle between the first and second longitudinally extending members.

10. The electric pushback vehicle of claim 9, wherein an electrical maintenance compartment is located on a side of the electric pushback vehicle, adjacent to the first longitudinally extending member and accessible via a hinged body panel.

11. An electric drive system comprising:
a traction battery;
an electric motor having an output shaft, wherein the electric motor is configured to rotate the output shaft in response to power received from the traction battery;
a transmission configured to communicate mechanical power generated by the electric motor to one or more of a front drive axle and a rear drive axle; and
a bellhousing affixed on a first end to the electric motor and on a second end to the transmission, wherein the first end includes an aperture configured to receive the output shaft of the electric motor;
a torque converter connected to communicate mechanical power generated by the electric motor to the transmission one or more components housed within the bellhousing and configured to connect the output shaft of the electric motor to the torque converter, wherein the one or more components include:
- a flange coupler that includes a female spline configured to receive a male spline on the output shaft; and
- an adapter ring connected to the flange coupler and to the torque converter to provide power from the output shaft to the torque converter.

12. The electric drive system of claim 11, wherein the flange coupler is a flexible elastomer.

13. The electric drive system of claim 11, further including a plurality of fingers, wherein the adapter ring is coupled to the torque converter through the plurality of fingers.

14. The electric drive system vehicle of claim 13, wherein an outer diameter of the adapter ring is coupled to a distal end of the plurality of fingers.

\* \* \* \* \*